United States Patent
Cox et al.

(10) Patent No.: US 9,816,192 B2
(45) Date of Patent: Nov. 14, 2017

(54) SYSTEM AND METHOD FOR EXTRACTION AND REFINING OF TITANIUM

(71) Applicant: Universal Technical Resource Services, Inc., Cherry Hill, NJ (US)

(72) Inventors: James R. Cox, Butte, MT (US); Chanaka L. DeAlwis, Butte, MT (US); Benjamin A. Kohler, Butte, MT (US); Michael G. Lewis, Butte, MT (US)

(73) Assignee: UNIVERSAL TECHNICAL RESOURCE SERVICES, INC., Cherry Hill, NJ (US)

( * ) Notice: Subject to any disclaimer, the term of this patent is extended or adjusted under 35 U.S.C. 154(b) by 903 days.

(21) Appl. No.: 13/725,484

(22) Filed: Dec. 21, 2012

(65) Prior Publication Data
US 2013/0164167 A1    Jun. 27, 2013

Related U.S. Application Data

(60) Provisional application No. 61/579,384, filed on Dec. 22, 2011.

(51) Int. Cl.
| | | |
|---|---|---|
| *C25C 3/28* | (2006.01) | |
| *C22B 34/12* | (2006.01) | |
| *C22C 14/00* | (2006.01) | |

(52) U.S. Cl.
CPC ............ *C25C 3/28* (2013.01); *C22B 34/1263* (2013.01); *C22B 34/1277* (2013.01); *C22C 14/00* (2013.01)

(58) Field of Classification Search
CPC .................. C22B 34/1263; C22B 34/1277
USPC ........................................................... 75/620
See application file for complete search history.

(56) References Cited

U.S. PATENT DOCUMENTS

| | | | |
|---|---|---|---|
| 910,394 A | 1/1909 | Kuhne | |
| 1,089,773 A | 3/1914 | Kraus | |
| 1,533,505 A | 4/1925 | Lubowsky | |
| 1,562,041 A | 11/1925 | Pacz | |
| 1,593,660 A | 7/1926 | Lubowsky | |
| 2,205,854 A | 6/1940 | Kroll | |
| 2,337,314 A | 12/1943 | Deppeler | |
| 2,684,653 A * | 7/1954 | Dyer | B63B 21/62 114/251 |
| 2,707,679 A | 5/1955 | Lilliendahl et al. | |

(Continued)

FOREIGN PATENT DOCUMENTS

| | | |
|---|---|---|
| GB | 2158102 | 8/1988 |
| GB | 2472496 | 8/2010 |

(Continued)

OTHER PUBLICATIONS

Kennedy, B. A.. (1990). Surface Mining (2nd Edition)—2.10.25.2 Distribution of Deposits. Society for Mining, Metallurgy, and Exploration (SME).*

(Continued)

*Primary Examiner* — Jessee Roe
*Assistant Examiner* — Jeremy Jones
(74) *Attorney, Agent, or Firm* — Greenberg Traurig LLP

(57) ABSTRACT

A method to extract and refine metal products from metal-bearing ores, including a method to extract and refine titanium products. Titanium products can be extracted from titanium-bearing ores with $TiO_2$ and impurity levels unsuitable for conventional methods.

64 Claims, 24 Drawing Sheets

(56) References Cited

U.S. PATENT DOCUMENTS

| | | | |
|---|---|---|---|
| 2,714,564 A * | 8/1955 | Loonam | C22B 34/1281 427/253 |
| 2,734,856 A * | 2/1956 | Schultz | C25C 3/28 204/247 |
| 2,777,763 A | 1/1957 | Whaley | |
| 2,789,896 A | 4/1957 | Coffer | |
| 2,823,991 A | 2/1958 | Kamlet | |
| 2,830,893 A | 4/1958 | Dean | |
| 2,848,395 A | 8/1958 | Carignan | |
| 2,857,264 A | 10/1958 | Schossberger | |
| 2,901,410 A | 8/1959 | Dean et al. | |
| 2,904,428 A | 9/1959 | Dean | |
| 2,929,473 A | 10/1959 | Dean et al. | |
| 2,913,380 A | 11/1959 | Gullett | |
| 2,917,440 A | 12/1959 | Olson | |
| 3,036,961 A | 5/1962 | Herasymenko | |
| 3,047,477 A | 7/1962 | Spraul et al. | |
| 3,098,021 A | 7/1963 | Hansen | |
| 3,386,817 A * | 6/1968 | Huml | C22B 5/04 75/395 |
| 3,406,056 A | 10/1968 | Albert et al. | |
| 3,625,676 A | 12/1971 | Perfect | |
| 3,746,535 A | 7/1973 | Brandstatter | |
| 3,966,455 A | 6/1976 | Taylor | |
| 4,169,722 A | 10/1979 | Fletcher | |
| 4,390,365 A | 6/1983 | Hard et al. | |
| 4,468,248 A | 8/1984 | Megy | |
| 4,793,854 A | 12/1988 | Shimotori et al. | |
| 4,985,069 A | 1/1991 | Traut | |
| 4,999,097 A | 3/1991 | Sadoway | |
| 5,254,232 A | 10/1993 | Sadoway | |
| 5,397,375 A | 3/1995 | O'Donnell et al. | |
| 5,404,929 A * | 4/1995 | Till | B22D 27/003 164/259 |
| 5,503,655 A | 4/1996 | Joseph | |
| 6,063,254 A | 5/2000 | Rosenberg | |
| 6,103,303 A | 8/2000 | Takahashi et al. | |
| 6,117,208 A | 9/2000 | Sharma | |
| 6,136,706 A | 10/2000 | Jabotinski et al. | |
| 6,245,211 B1 | 6/2001 | Fortin | |
| 6,309,595 B1 | 10/2001 | Rosenberg et al. | |
| 6,663,763 B2 | 12/2003 | Strezov et al. | |
| 6,958,115 B2 | 10/2005 | O'Gardy et al. | |
| 7,470,355 B2 | 12/2008 | Osborn et al. | |
| 7,504,017 B2 | 3/2009 | Cardarelli | |
| 7,527,669 B2 | 5/2009 | Morrell et al. | |
| 7,985,326 B2 | 7/2011 | Withers et al. | |
| 2005/0166706 A1 | 8/2005 | Withers et al. | |
| 2005/0279187 A1* | 12/2005 | Shekhter | B22F 9/20 75/363 |
| 2006/0237327 A1 | 10/2006 | Withers et al. | |
| 2010/0132123 A1 | 6/2010 | Gladney et al. | |
| 2010/0237280 A1* | 9/2010 | Barnes | C21B 13/0046 252/182.33 |
| 2011/0097501 A1 | 4/2011 | Hollins et al. | |

FOREIGN PATENT DOCUMENTS

| | | | |
|---|---|---|---|
| JP | 07165423 | | 6/1995 |
| JP | 08-225980 | | 9/1996 |
| JP | 08225980 A | * | 9/1996 |
| RU | 2338805 C2 | * | 11/2008 |
| WO | 0162996 | | 8/2001 |
| WO | 03046258 | | 6/2003 |
| WO | 2007097823 | | 8/2007 |
| WO | 2008016526 | | 2/2008 |
| WO | 2011015845 | | 2/2011 |

OTHER PUBLICATIONS

Freitas, Lino R., Paulo R. Mazoni, and Magid W. Saab. "Aluminothermic Reduction of Anatase Concentrates." INFACON 86 Proceedings (1986): 349-62. INFACON: International Ferro-Alloys Congress. Web. Nov. 3, 2015.*

Lowrie, Raymond L.. (2002). SME Mining Reference Handbook—9.34 Tin. Society for Mining, Metallurgy, and Exploration (SME).*

ASM International Handbook Committee. (2008; 2010). ASM Handbook, vol. 15—Casting—19.2 Furnace Types. ASM International.*

EPO, Supplementary European Search Report, EP 12859572, dated May 19, 2015.

Paul C. Turner et al., Low Cost Titanium—Myth or Reality, www.osti.gov/scitech/servlets/purl/899609.

David S. Van Vuuren, Direct titanium powder production by metallothermic processes, Titanium Power Metallurgy, 2015, Elsevier Inc.

D.S. Van Vurren, A critical evaluation of processes to produce primary titanium, The Journal of the Southern Africa Institute of Mining and Metallurgy, Aug. 2009, vol. 109.

* cited by examiner

SYSTEM AND METHOD FOR EXTRACTION AND REFINING OF TITANIUM

CROSS-REFERENCE TO THE RELATED APPLICATION

This application claims benefit to U.S. provisional application No. 61/579,384, filed Dec. 22, 2011.

ACKNOWLEDGEMENT OF U.S. GOVERNMENT FUNDING

This invention was made with Government support under Contract Nos. DAAB07-03-D-B011 and DAAB07-03-D-B012 awarded by the United States Army. The Government has certain rights in the invention.

BACKGROUND OF THE DISCLOSURE

1. Field of the Invention

The present invention relates to a system and method for extracting and refining metals, and more particularly, to a system and method for extracting and refining titanium.

2. Description of the Related Art

Titanium, the ninth most commonly occurring element in the Earth's crust (and $4^{th}$ most abundant structural material), is a corrosion-resistant material with high strength, a high melting point, and a density approximately 40% less than that of iron's. These characteristics make titanium the material of choice for many engineering applications.

However, conventional methods to extract titanium from titanium-bearing ores are costly and inefficient. The most popular conventional method uses titanium tetrachloride ($TiCl_4$), a hazardous chemical, as its feedstock, and forms hydrochloric acid (HCl) as a byproduct. In addition, most conventional methods discharge large amounts of greenhouse gases, such as carbon dioxide ($CO_2$), during the formation of the feedstocks and are limited to high concentration/low impurity titanium-bearing ores as the initial inputs.

Accordingly, there is a need for a metal extraction and refining processes, and in particular, for titanium extraction and refining processes, that limit the use of hazardous chemicals or environmental pollutants, and that are capable of using lower concentration titanium-bearing ores.

SUMMARY OF THE DISCLOSURE

The present invention provides a system and method for the extraction and refining of metal products.

The present invention also provides systems and methods for the extraction and refining of titanium products from a variety of titanium-bearing ores that reduce the use of hazardous chemicals, such as $TiCl_4$, while simultaneously reducing the generation of greenhouse gases, such as $CO_2$.

Additional aspects and advantages of the present invention will be set forth in part in the description which follows and, in part, will be obvious from the description, or may be learned by practice of the invention.

The present invention may be achieved by providing a method of extracting a titanium product from a titanium-bearing ore, including mixing a chemical blend comprising the titanium-bearing ore and a reducing agent, wherein a ratio of the titanium-bearing ore to the reducing agent corresponds to a weight ratio of titanium oxide component in the titanium-bearing ore:reducing metal in the reducing agent of 0.9 to 2.4; heating the chemical blend to initiate an extraction reaction, wherein the chemical blend is heated at a ramp up rate between 1° C. to 50° C./min; maintaining the chemical blend at a reaction temperature between 1500-1800° C. for a time period between 5 and 30 minutes; cooling the chemical blend to a temperature less than 1670° C.; and separating a titanium product from a residual slag.

In another embodiment when tested with a titanium-bearing ore comprises (by weight) between 25% and 95% titanium oxide ($TiO2$), and at least one of up to 30% calcium (Ca), up to 20% magnesium (Mg), up to 20% manganese (Mn), and up to 35% iron (Fe) a yield of titanium metal in the titanium product from the titanium-bearing ore is between 85% and 95% by weight.

In another embodiment the yield is more than 90%.

In another embodiment the heating of the chemical blend comprises heating the chemical blend at a ramp up rate of 10° C./min.

In another embodiment the ramp up rate is between 5° C. and 10° C./min.

In another embodiment the ramp up rate is 10° C./min.

In another embodiment the reaction temperature is 1725° C.

In another embodiment the chemical blend is maintained at the reaction temperature for a time period between 10 and 20 minutes.

In another embodiment the chemical blend is maintained at the reaction temperature for a time period between 12 and 18 minutes.

In another embodiment the titanium-bearing ore comprises titanium oxide ($TiO2$) and the reducing agent comprises aluminum (Al) and a weight ratio of TiO2:Al in the chemical blend is 0.90 to 2.4.

In another embodiment a weight ratio of TiO2:Al in the chemical blend is 1 to 2.2.

In another embodiment a weight ratio of TiO2:Al in the chemical blend is 1.2 to 2.1.

In another embodiment a weight ratio of TiO2:Al in the chemical blend is 1.35 to 1.9.

In another embodiment a weight ratio of TiO2:Al in the chemical blend is 1.4 to 1.85.

In another embodiment the chemical blend comprises a viscosity agent.

In another embodiment the titanium-bearing ore comprises titanium oxide ($TiO2$), the reducing agent comprises aluminum (Al), and the viscosity agent comprises calcium fluoride ($CaF2$), and the ratio of titanium-bearing ore to reducing agent to viscosity agent corresponds to the following equation: $3TiO2+(4+x)Al+yCaF2 \rightarrow 3Ti+xAl+2Al2O3+yCaF2$, and wherein $0 \leq x \leq 3$ and $2 \leq y \leq 6$.

In another embodiment $0.3 \leq x \leq 2$ and $2 \leq y \leq 3$.

In another embodiment $x=0.8$ and $y=2.5$.

In another embodiment the titanium-bearing ore comprises less than 90% by weight titanium oxide ($TiO2$).

In another embodiment the titanium-bearing ore comprises less than 75% by weight titanium oxide ($TiO2$).

In another embodiment the titanium-bearing ore comprises less than 50% by weight titanium oxide ($TiO2$).

In another embodiment the titanium-bearing ore comprises up to 30% by weight calcium (Ca).

In another embodiment the titanium-bearing ore comprises up to 20% by weight magnesium (Mg).

In another embodiment the titanium-bearing ore comprises up to 20% by weight manganese (Mn).

In another embodiment the titanium-bearing ore comprises up to 35% by weight iron (Fe).

In another embodiment the chemical blend is substantially free of titanium tetrachloride ($TiCl_4$).

In another embodiment the chemical blend is substantially free of sulfuric acid (H2SO4).

In another embodiment the method creates one of a solid or liquid product in the absence of gaseous products.

In another embodiment the titanium-bearing ore has a particle size of at least 100 microns.

In another embodiment the titanium-bearing ore has a particle size of at least 500 microns.

In another embodiment the titanium-bearing ore comprises at least 1% by weight calcium (Ca).

In another embodiment the titanium-bearing ore comprises at least 1% by weight magnesium (Mg).

In another embodiment the titanium-bearing ore comprises at least 1% by weight manganese (Mn).

In another embodiment the titanium-bearing ore comprises at least 1% by weight iron (Fe).

In another embodiment the titanium-bearing ore has a particle size between 37 and 2000 microns.

The present invention may also be achieved by providing a method of refining a titanium product, including placing the titanium product into a reaction vessel having an anode, a cathode, and an electrolyte; heating the reaction vessel to a temperature between 600 to 900° C. to create a molten mixture and applying an electrical differential between the anode and the cathode to deposit titanium ions on the cathode; and terminating the electrical differential and allowing the molten mixture to cool to create a refined titanium product, wherein a surface area of the refined titanium product is at least 0.1 $m^2/g$.

In another embodiment the surface area of the refined titanium product is between 0.1 $m^2/g$ and 2.5 $m^2/g$.

In another embodiment the surface area of the refined titanium product is between 0.4 $m^2/g$ and 2.0 $m^2/g$.

In another embodiment the surface area of the refined titanium product is 1.8 $m^2/g$.

In another embodiment the refined titanium product is fibrous.

In another embodiment the refined titanium product has a wool-like morphology (titanium wool) and is capable of being compacted into near-net shaped green compacts without the aid of a binding agent.

In another embodiment the refined titanium product comprises titanium wool.

In another embodiment the method includes placing a non-conductive or ceramic material between the anode and the cathode before the heating of the titanium product to create a coating of refined titanium product.

In another embodiment the coating comprises at least 95% titanium metal by weight.

In another embodiment the coating comprises at least 99% titanium metal by weight.

In another embodiment the coating comprises at least 99.9% titanium metal by weight.

In another embodiment the refined titanium product comprises at least 90% titanium metal.

In another embodiment the anode is non-consumable.

In another embodiment the electrical differential is between 0.5 and 2.5 volts.

In another embodiment the electrical differential is between 1.0 and 1.8 volts.

In another embodiment the anode is in the form of a mesh container to hold the titanium product during the applying of the electrical differential.

In another embodiment the anode is adjustable.

In another embodiment the anode is adjusted to maintain a distance between the anode and the cathode of between 1 cm and 6 cm.

In another embodiment the anode is adjusted to maintain a distance between the anode and the cathode of between 2 cm and 4 cm.

In another embodiment the anode is adjusted to maintain a distance between the anode and the cathode of 3 cm.

In another embodiment the titanium product is extracted from a titanium-bearing ore.

In another embodiment the heating of the reaction vessel comprises placing the reaction vessel within an induction furnace.

In another embodiment the titanium product comprises iron and the reaction vessel comprises molybdenum to shield the molten mixture from magnetic fields generated by the induction furnace.

The present invention may also be achieved by providing a titanium wool product having a surface area of at least 0.1 $m^2/g$.

In another embodiment the titanium wool product comprises at least 98% titanium and the surface area of the refined titanium product is between 0.1 $m^2/g$ and 2.5 $m^2/g$.

In another embodiment the titanium wool product comprises between 90-96% titanium, 4-9% Al, and up to 1% O, and the surface area of the titanium wool product is 1.8 $m^2/g$.

In another embodiment the titanium wool product consists essentially of between 90-96% titanium, 4-9% Al, and up to 1% O, and the surface area of the titanium wool product is 1.8 $m^2/g$.

In another embodiment the surface area of the titanium wool product is 1.8 $m^2/g$.

The present invention may also be achieved by providing a method of producing a refined titanium product, including refining a titanium product obtained from the thermal extraction of a titanium-bearing ore; and subjecting the titanium product to an electrochemical separation process to create a refined titanium product, wherein the titanium-bearing ore comprises, by weight, between 25% and 95% titanium oxide (TiO2), and at least one of up to 30% calcium (Ca), up to 20% magnesium (Mg), up to 20% manganese (Mn), and up to 35% by weight iron (Fe).

In another embodiment the titanium-bearing ore comprises at least one of more than 50% titanium oxide (TiO2), more than 1% calcium (Ca), more than 1% magnesium (Mg), more than 1% manganese (Mn), and at least 1% by weight iron (Fe).

In another embodiment the titanium product is extracted from a titanium-bearing ore.

In another embodiment the refined titanium product is refined from a titanium product.

In another embodiment the refined titanium product is refined from off grade titanium sponge or scrap titanium.

The present invention may also be achieved by providing a refined titanium product having a surface area of 1.8 $m^2/g$ refined from a titanium product.

The present invention may also be achieved by providing a titanium refining apparatus, including a reaction vessel to refine a titanium product; a cathode disposed within the reaction vessel to receive a refined titanium product; an anode disposed within the reaction vessel to hold the titanium product; a heat source to heat the reaction vessel; and a power source to power the heat source and to provide an electrical differential between the anode and the cathode of between 0.5 and 2.5 volts, wherein the anode is adjustable to maintain a distance between the anode and the cathode of between 2 cm and 4 cm.

In another embodiment the anode is non-consumable.

In another embodiment the heat source is an induction furnace and the reaction vessel comprises a molybdenum susceptor to shield the molten mixture from magnetic fields generated by the induction furnace.

In another embodiment the apparatus includes a holder to hold a non-conductive or ceramic material between the anode and the cathode to be coated with the refined titanium product.

In another embodiment when tested to refine a test titanium product having at least 75% titanium by weight produces a refined titanium product comprising at least 90% titanium and having a surface area of 1.8 $m^2/g$.

In another embodiment the test titanium product comprises at least one or more of more than 1% calcium (Ca), more than 1% magnesium (Mg), more than 1% manganese (Mn), and up to 35% by weight iron (Fe).

BRIEF DESCRIPTION OF THE DRAWINGS

These and/or other aspects and advantages of the present invention will become apparent and more readily appreciated from the following description of the various embodiments, taken in conjunction with the accompanying drawings in which.

The drawings above are not necessarily to scale, with emphasis instead generally being placed upon illustrating the principles of the present invention. Further, some features may be exaggerated to show details of particular components. These drawings/figures are intended to be explanatory and not restrictive of the invention.

DETAILED DESCRIPTION OF THE PREFERRED EMBODIMENT

Reference will now be made in detail to the various embodiments of the present invention. The embodiments are described below to provide a more complete understanding of the components, processes and apparatuses of the present invention. Any examples given are intended to be illustrative, and not restrictive. Throughout the specification and claims, the following terms take the meanings explicitly associated herein, unless the context clearly dictates otherwise. The phrases "in some embodiments" and "in an embodiment" as used herein do not necessarily refer to the same embodiment(s), though they may. Furthermore, the phrases "in another embodiment" and "in some other embodiments" as used herein do not necessarily refer to a different embodiment, although they may. As described below, various embodiments of the present invention may be readily combined, without departing from the scope or spirit of the present invention.

As used herein, the term "or" is an inclusive operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

In one embodiment, the present invention provides systems and methods for the extraction and refining of metal products including the use of metal-bearing ores, extraction of metal products from the metal-bearing ores, and refining of the extracted metal products into refined metal products. For example, in some embodiments, the present invention provides systems and methods for the extraction and refining of titanium products from titanium-bearing ores. However, the present invention is not limited thereto, and other embodiments of the present invention may be used for the extraction and refining of other metal products, such as, but not limited to, iron, chromium, copper, manganese, silicon, zirconium, molybdenum, silver, vanadium, nickel, cobalt, tin, and rare-earth metals.

Figure 1:
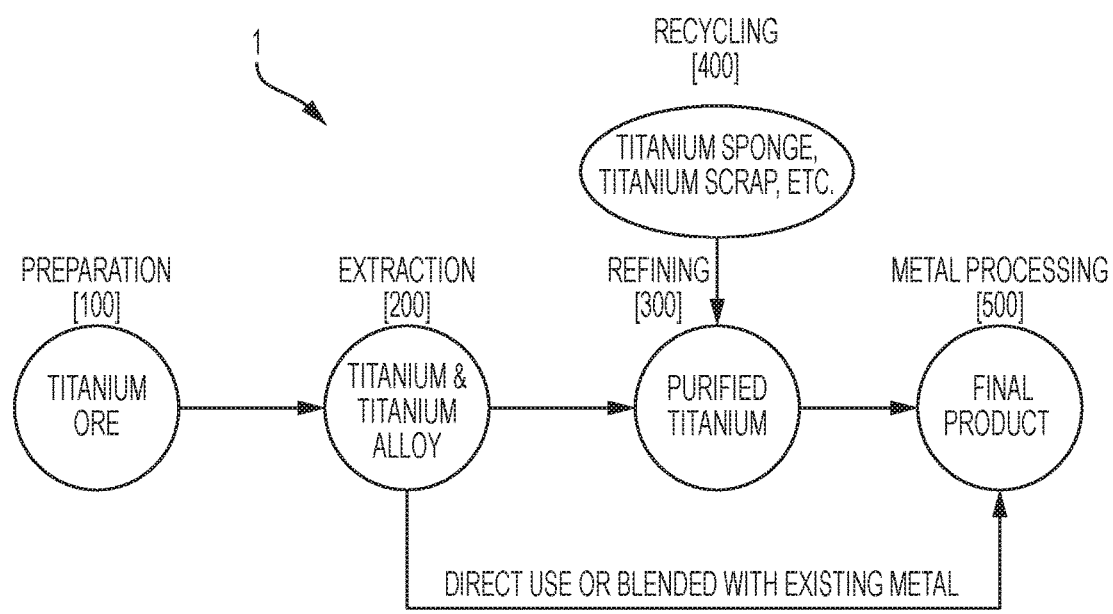
FIG. 1 illustrates a method for the extraction and refining of titanium products from titanium-bearing ores according to an embodiment of the present invention.

One embodiment of the present invention provides a method for the extraction and refining of titanium products from titanium-bearing ores. As illustrated in FIG. 1, a method for the extraction and refining of titanium products (1) may include preparation of the titanium-bearing ore (100), extracting the titanium product from the titanium-bearing ore (200), and refining the extracted titanium product (300). In other embodiments, the method may include recycling titanium (400) into the refining of the titanium products (300) and processing the extracted or refined titanium products into final titanium products (500).

Unlike conventional processes, the present invention provides an economical and environmentally safe method of extracting titanium products from a wide variety of titanium-bearing ores. While conventional methods are limited to the use of titanium-bearing ores with high concentrations of titanium, the present invention may use lower-grade titanium-bearing ores. For example, when measured in terms of titanium oxide ($TiO_2$) content, many conventional methods require that the initial titanium-bearing ore have a $TiO_2$ concentration of at least 90%. In contrast, in some embodiments, the present invention can be used with titanium-bearing ores, or mixtures of titanium-bearing ores, having a $TiO_2$ concentration of less than 90%. In another example, the present invention can be used with titanium-bearing ores, or mixtures of titanium-bearing ores, having a TiO2 concentration of less than 85%. In another example, the present invention can be used with titanium-bearing ores, or mixtures of titanium-bearing ores, having a TiO2 concentration of less than 80%. In another example, the present invention can be used with titanium-bearing ores, or mixtures of titanium-bearing ores, having a TiO2 concentration of less than 75%. In another example, the present invention can be used with titanium-bearing ores, or mixtures of titanium-bearing ores, having a TiO2 concentration of less than 70%. In another example, the present invention can be used with titanium-bearing ores, or mixtures of titanium-bearing ores, having a TiO2 concentration between 25% and 95%. In yet another example, the present invention can be used with titanium-bearing ores, or mixtures of titanium-bearing ores, having a TiO2 concentration of at least 35%. In another example, ores consist of materials unsuitable for the pigment or aerospace industries (e.g., Perovskite ($CaTiO_3$), Sphene ($CaTiSiO_5$), Kassite ($CaTi_2O_4(OH)_2$), Srilankite ($(Ti,Zr)O_2$, Geikielite ($MgTiO_3$), impure $TiO_2$, and titanium ore sources that have levels of contaminants too high for the Kroll process. In addition, many conventional methods are unable to process titanium-bearing ores above certain impurity levels, or above a threshold for titanium particle size. In contrast, in some embodiments, the present invention can use titanium-bearing ores, or mixtures of titanium-bearing ores, having large concentrations of impurities, such as less than 30% calcium or 20% oxygen by weight, and having particle sizes of over 100 microns in diameter. In one embodiment, the present invention can use titanium-bearing ores, or titanium-bearing ore concentrates, having particle sizes of less than 1000 microns in diameter. In other embodiments, the present invention can use titanium-bearing ores having between 25% and 95% titanium oxide (TiO2), up to 30% calcium (Ca), up to 20% magnesium (Mg), up to 20% manganese (Mn), and at least 5% by weight iron (Fe). In another embodiment, the present invention can use titanium-bearing ores having, by weight more than 0.1% or more than 0.5% calcium (Ca), more than 0.1% or more than 0.5% magnesium (Mg), more than 0.1% or more than 0.5% manganese (Mn), and more than 0.1% or more than 0.5% iron (Fe). In another embodiment, the present invention can use titanium-bearing ores having more than 50% titanium oxide (TiO2), more than 1% calcium (Ca), more than 1% magnesium (Mg), more than 1% manganese (Mn), and more than 1% by weight iron (Fe). In another embodiment, the present invention can use titanium-bearing ores having more than 2% calcium (Ca), more than 2% magnesium (Mg), more than 2% manganese (Mn), and more than 2% by weight iron (Fe).

In one embodiment of the invention, the method for the extraction of titanium products from a titanium-bearing ore and the refining of the extracted titanium metal products (1) may include preparing the titanium-bearing ore for extraction. While some embodiments of the present invention are able to use titanium-bearing ores in their raw state with minimal preparation, most titanium extraction processes use titanium-bearing ore concentrates. Titanium-bearing ores are typically laden with impurities and agglomerated as taken from the earth. Accordingly, the raw titanium-bearing ore may be subject to cleaning or concentration processes during operation (100) to remove gangue minerals and to create titanium-bearing ore concentrates before extracting the titanium product therefrom in operation (200). For example, the raw titanium-bearing ore may be subject to a physical concentration method, such as crushing, separation of heavier and lighter particles, and may be subject to removal of gangue minerals by spiral concentration to produce a titanium-bearing ore concentrate. In one embodiment, the raw titanium-bearing ores or titanium-bearing ore concentrates are ground to a nominal particle size range of between 50 to 200 micron diameter in operation (100). In another embodiment, the raw titanium-bearing ores or titanium-bearing ore concentrates are processed to have a particle size range of up to 1000 micron diameter in operation (100). Table 1 illustrates the composition of various titanium-bearing ore concentrates used for operation (200).

In operation (200), titanium product is extracted from the titanium-bearing ore. The titanium-bearing ore may be prepared beforehand into a titanium-bearing ore concentrate in operation (100). In one embodiment of the invention, extracting the titanium product from the titanium-bearing ore (200) includes a thermal extraction reaction. For example, in one embodiment, the titanium-bearing ore is subject to thermal extraction to produce the titanium product. In some embodiments, the titanium-bearing ore is mixed with other components and agents to create a chemical blend that is then subjected to the thermal extraction. For example, the titanium-bearing ore may be mixed with one or more other components, such as reducing agents, viscosity agents, and heat generating components, to create the chemical blend subjected to thermal extraction in operation (200).

In one embodiment, the chemical blend includes a reducing agent, such as aluminum (Al). In general, metals that are more reactive than the metal species within the ore that is being reduced can be used as reducing agents. However, factors such as a low cost, a low melting point (660° C.), and a high boiling point (2519° C., much higher than titanium's 1670° C. melting point) influence the choice of reducing agent, and make aluminum a good choice as a reducing agent. In other embodiments, magnesium, calcium, and sodium may be use as the reducing agent.

In another embodiment, the chemical blend includes one or more viscosity agents to achieve a desired slag viscosity. Adjusting the slag viscosity allows efficient separation of the metal from the metal-bearing ore, and produces a slag that can be removed from the metal after solidification and cooling has occurred. In one embodiment, viscosity agents are chosen that only affect the viscosity of the chemical blend and resulting slag, and affect the heat of the chemical blend only to a limited extent. Calcium fluoride ($CaF_2$) is one example of such a viscosity agent. CaF2 does not take part in the chemical reaction between the titanium-bearing ore and the reducing agent, and only aids in controlling the viscosity of the melt. Moreover, the melting point (1418° C.) and boiling point (2533° C.) of CaF2 bracket the melting point of Titanium (1670° C.) making it a good choice as a viscosity agent. In general, components that do not take part in the reaction and aid in controlling the viscosity of the slag are potential candidates. In some embodiments, various alkali halides, alkali-earth halides, and some oxides may be used as viscosity agents.

In one embodiment, the amount of other components needed for the chemical blend corresponds to the composition of the titanium-bearing ore. For example, for a Rutile (TiO2) titanium-bearing ore concentrate, the amount of other components would correspond to the following equation: $3TiO2+(4+x)Al+yCaF2 \rightarrow 3Ti+xAl+2Al2O3+yCaF2$. In one embodiment, x and y can be varied as follows: $0 \leq x \leq 3+$ and $2 \leq y \leq 6+$. In another embodiment, the ranges of x and y are $0.3 \leq x \leq 2$ and $2 \leq y \leq 3$. In yet another embodiment, $x=0.8$ and $y=2.5$.

In another embodiment, the chemical blend includes a TiO2 titanium-bearing ore and an aluminum (Al) reducing agent and the weight ratio of TiO2:Al in the chemical blend is from 0.90 to 2.4. In others of these embodiments, the weight ratio of TiO2:Al in the chemical blend is from 1 to 2.2. In yet others of these embodiments, the weight ratio of TiO2:Al in the chemical blend is from 1.2 to 2.1. In others of these embodiments, the weight ratio of TiO2:Al in the chemical blend is from 1.35 to 1.9. In yet others of these embodiments, the weight ratio of TiO2:Al in the chemical blend is from 1.4 to 1.85.

According to embodiments of the present invention, the extraction operation (200) may be internally or externally heated.

In one embodiment, the extraction operation (200) is carried out by an internally heated reaction using chemical components selected to produce an internally heated, self-sustaining, extraction reaction. The heat generated during the extraction reaction must be sufficient to keep the chemical blend in a molten state to allow effective metal/slag separation.

For example, in an internally heated extraction operation (200), titanium is separated (extracted) from the titanium-bearing blend to form the titanium product using a reducing agent, such as aluminum metal, to produce aluminum oxide and titanium metal according to the following equation: 
$3TiO_2 + 4Al \rightarrow 3Ti + 2Al_2O_3$.

Figure 2:
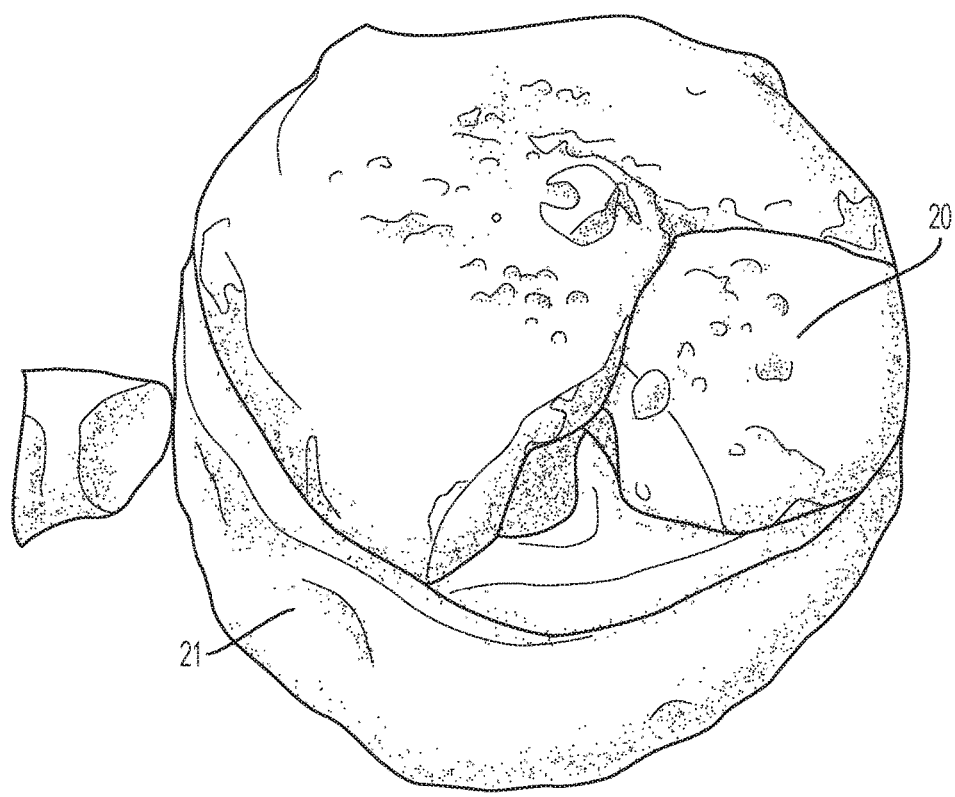
FIG. 2 illustrates a titanium product puck and slag obtained according to an embodiment of the present invention.

FIG. 2 illustrates a titanium product puck (20) and slag (21) obtained from a self-heated extraction reaction. The extraction reaction products illustrated in FIG. 2 have been inverted to show the titanium product puck (20) (on top in the image) separated from the slag (21) (bottom of image). In other embodiments, the composition of the resulting titanium product puck depends on the composition of the titanium-bearing ore that is used in the extraction operation (200). For example, titanium product resulting from an Ilmenite ($FeTiO_3$) ore will include titanium metal and iron.

The heat generated by the titanium-bearing ore and the reducing agent in the chemical blend may not be sufficient to drive the extraction reaction by themselves. That is, in order to drive the extraction reaction, the chemical blend must reach a temperature of at least 1670° C. to melt the titanium in the chemical blend and sustain that temperature for a minimum period of time. Accordingly, in some embodiments of the invention, the chemical blend includes heat generating components to produce supplementary heat to drive the extraction reaction and the separation of the titanium product from the slag. The heat generating component will become a residual product that is mixed with the slag when the extraction reaction is complete. Calcium sulfate, sulfur, and sodium chlorite are examples of suitable heat generating components.

In one embodiment of the present invention, the components of the chemical blend used for a self-heating extraction reaction are selected to be stable at room temperature with a high thermal threshold to prevent spontaneous ignition. In such cases, an ignition component may be required to start the extraction reaction. This ignition component must provide enough heat in a localized area to push the extraction reaction over a thermal threshold. Once the reaction starts, it spreads throughout the rest of the chemical blend and may became self-sustaining. Examples of ignition components include magnesium metal strips or potassium permanganate ($KMnO_4$) combined with glycerin.

In another embodiment of the invention, the extraction operation (200) is carried out using an external heat source. For example, in one embodiment, the extracting operation (200) uses an external induction furnace to heat the chemical blend. In other embodiments, the chemical blend is heated with other external heat sources, such as a resistive heating furnace or an induction furnace. An externally heated extraction reaction has a number of advantages over an internal self-heating reaction and avoids many of the associated potential problems described above. In general, in an externally heated extraction reaction, the external heat initiates the extraction process at a temperature between 1500° C. and 1600° C. during the induction furnace temperature ramp up. Externally heated extraction reactions heat the entire reaction vessel, and allow the chemical blend to blend evenly and thoroughly, allowing the resulting titanium product and slag to separate well.

In one embodiment, the chemical blend does not need additional heat generating components to provide supplementary internal heat when it is externally heated. Accordingly, the chemistry of the resulting slag is less complex, allowing for a more straightforward recycling or disposal of the slag. In addition, when the components of the chemical blend are selected to be stable at room temperature or to prevent spontaneous ignition, the external heat source can be used to initiate the extraction reaction without the use of ignition components.

In one embodiment, the externally heated extraction operation (200) can be performed by using an inert atmosphere to prevent oxygen contamination of the reaction products. For example, the extraction reaction may be perform under an argon or helium atmosphere. An externally heated extraction reaction is not dependent on the chemical blend to generate heat. Instead, the external heat source provides the necessary heat that controls the extraction reaction. In addition, when using external heat generators, the heat is more evenly distributed throughout the blend as opposed to starting in a small, localized area and spreading through the rest of the chemical blend as is the case when using ignition components. Externally heated extraction reactions allows the reaction products (i.e., metal and slag) to separate more efficiently. Additionally, the reaction temperature can be controlled more to provide only enough heat to drive the extraction reaction and avoid reaction of the titanium product with the slag or reaction vessel. For example, in one embodiment, the chemical blend is placed within the induction furnace and the induction furnace is set to ramp up at a rate of 10° C./min. In other embodiments, the ramp up rate is between 5° C. to 15° C./min. In other embodiments, the ramp up rate is between 50° C. and 125° C./min. When the temperature of the chemical blend reaches between 1525 and 1600° C., the extraction reaction is initiated. As the induction furnace ramps up toward a final temperature of 1725° C., the extraction reaction continues, and enough heat is generated during this phase of the heating profile to separate the titanium product from the slag. Because both the titanium product and slag are molten at this temperature, the slag, having a lower density, rises and "floats" above the molten titanium product. In one embodiment, the temperature is maintained at 1725° C. for between 10 and 20 minutes from the initiation of the extraction reaction. In some embodiments, the final temperature is between 1500° C. and 1800° C. and the reaction time is between 5 and 30 minutes. In other embodiments, the final temperature is between 1700° C. and 1750° C. and the reaction time is between 12 and 18 minutes. In some embodiments, the reaction time range separates the titanium product from the slag and produces titanium metal yields of between 85% and 95% based on the total amount of titanium in the titanium-bearing ore concentrate. If the final temperature is maintained for less than 8 minutes, or if the final temperature is less than 1650°, the extraction reaction will have less titanium product/slag separation leading to lower titanium metal yields. If the final temperature is above 1800° C., or if the final temperature is maintained for more than 30 minutes, the extraction reaction will produce titanium products with higher levels of contamination as the molten titanium product reacts with the reaction vessel and the slag.

The ability to adjust the reaction temperature by an external heat source, and controlling the duration of the period at the final temperature, allows more flexibility when selecting chemical ratios for the extraction reaction and the type of chemical components used. This flexibility enables the efficient incorporation of a wide range of raw ores into the process and improves the overall efficiency of the production process.

FIGS. 3-10 illustrate embodiments of a titanium extraction system. As illustrated in FIGS. 3-10, in one embodiment, a system for the extraction of titanium metal (2) includes a reaction vessel, a heating source, and a power supply.

In one embodiment, the heating source is a resistive heating element. In another embodiment, the heating source is an induction furnace having an induction power generator (31) and a containment housing (30). The induction furnace is capable of providing the needed amount of heat to initiate and maintain the chemical reaction in the extraction operation (200) while allowing for fast heat dissipation. In some embodiments, the use of an induction furnace provides the following advantages: inductive heating takes the chemical blend (36) above the thermal reaction threshold temperature in a short time period; uniform heating throughout the chemical blend (36) avoids localized extraction reactions and provides good metal/slag separation; and quick heat dissipation avoids contamination of the titanium-product by reacting with the vessel walls and the slag.

In one embodiment, the containment housing (30) houses a susceptor crucible (34) and/or the extraction vessel (37) and the induction power generator (31) generates an induction field using an induction heating coil (33) to heat the chemical blend (36) for the extraction operation (200). In one embodiment, the susceptor crucible (34) does not come in direct contact with the chemical blend (36) and can be made of a variety of materials that couple well with an induction field. For example, refractory metals, such as molybdenum (Mo) and tungsten (W), and graphite (C) work well as the susceptor crucible (34). In other embodiments, the extraction vessel (37) contains the chemical blend (36) within the induction furnace and may be constructed from a material that is compatible with or inert towards the chemical blend (36) while able to withstand high temperature (e.g., melting point of titanium ~1670° C.). Refractory metals, graphite, and ceramic materials may be used for the extraction vessel (37). Additionally, in other embodiments, materials for the extraction vessel (37) may be chosen to be transparent to the induction field, enabling metal within the chemical blend (36) to couple directly with the induction field, thus providing heat for the reaction. Moreover, in some embodiments, magnetic fields generated by the induction furnace can be effectively used to stir the reactants in the chemical blend (36). In addition, in some embodiments, an insulator (35) may be used to insulate the susceptor crucible (34) and/or the extraction vessel (37).

Figure 3:
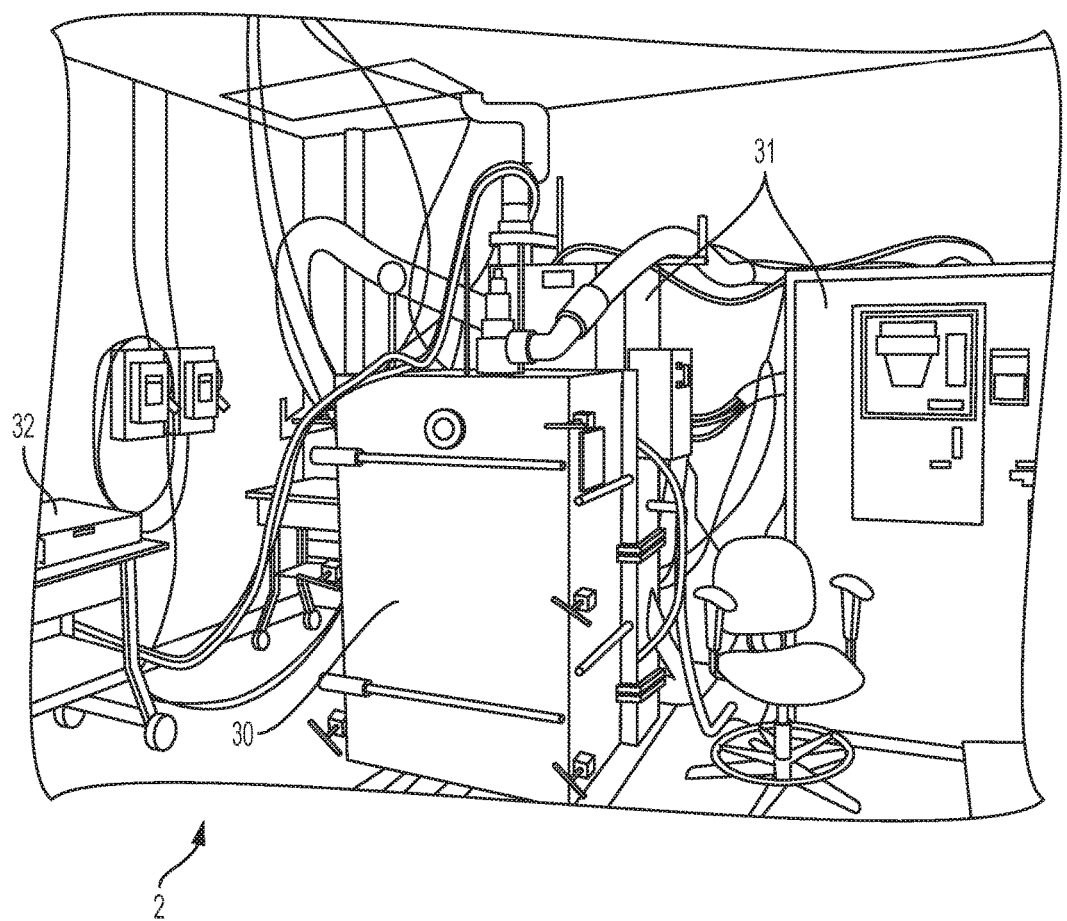
FIGS. 3 and 4 illustrate a system for the extraction and refining of titanium products from titanium-bearing ores according to embodiments of the present invention.
Figure 4:
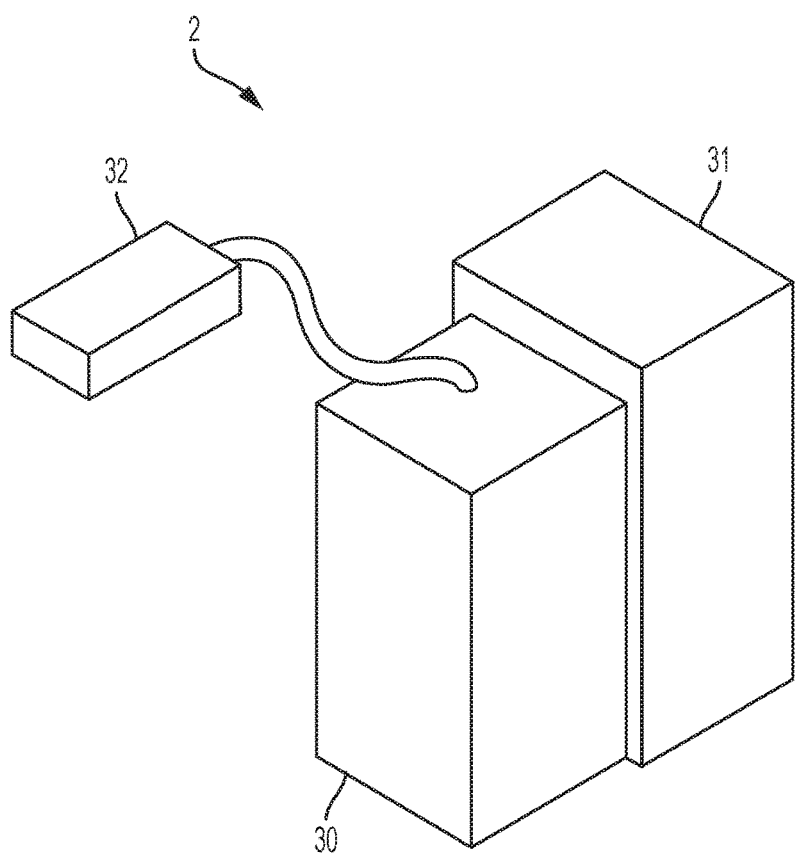
Figure 5:
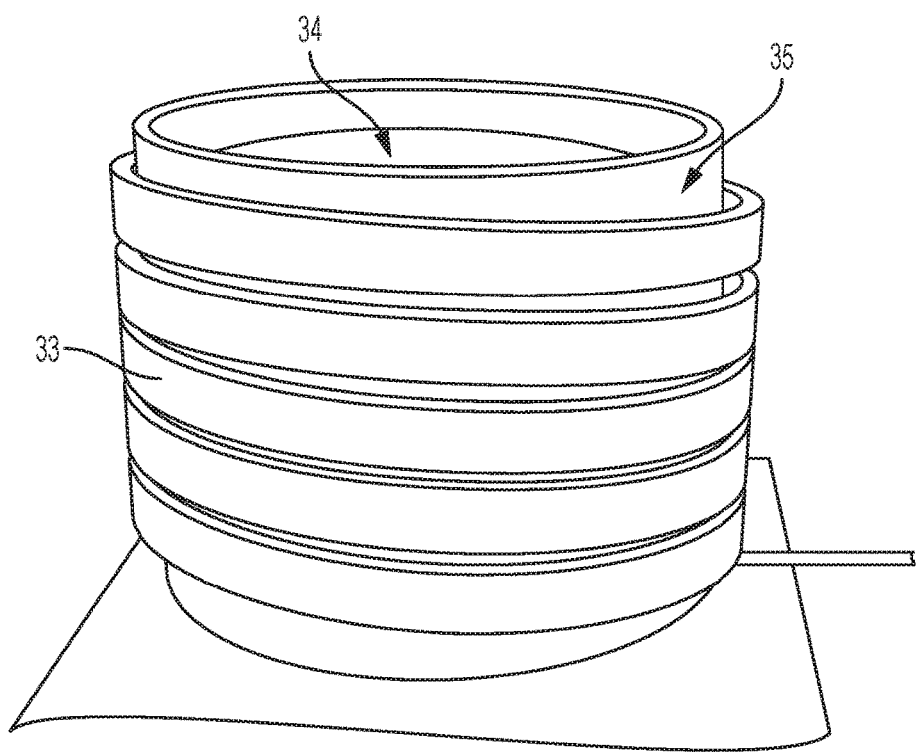
FIGS. 5-6 illustrate a heating source and an extraction vessel according to embodiments of the present invention.
Figure 6:
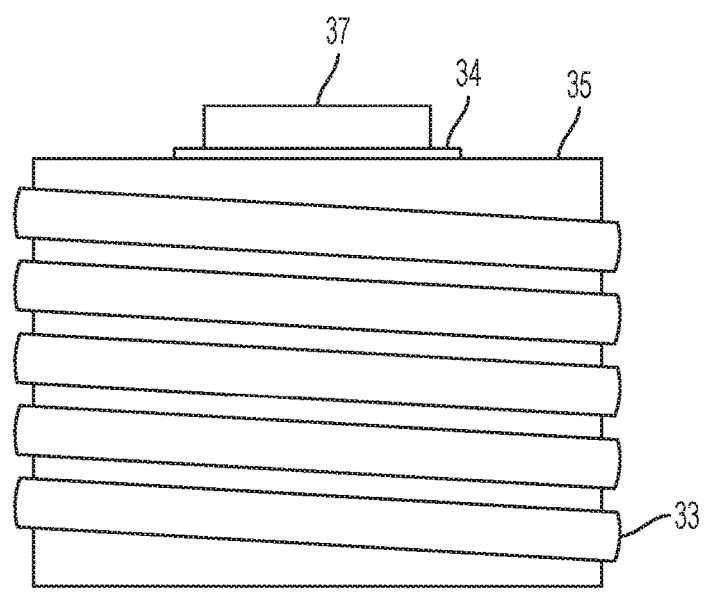

For example, as illustrated in FIGS. 3-4, the external heat source may be embodied as an external induction heater having a containment housing (30), induction generator (31), and direct current (DC) power supply (32). As illustrated in FIGS. 5-6, an induction heating coil (33) surrounds a ceramic insulation cylinder (35) and is used to heat the susceptor crucible (34) and extraction vessel (37) inside of the ceramic insulation cylinder (35).

Figure 7:
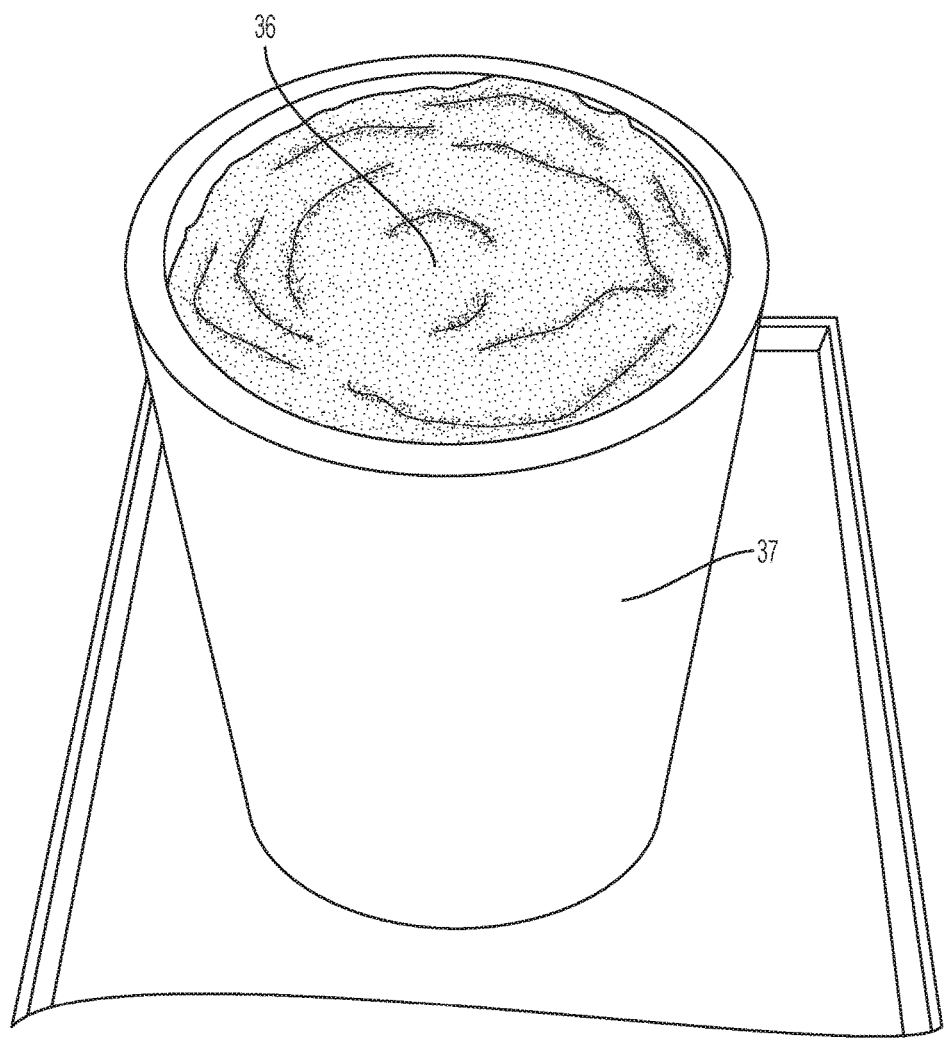
FIGS. 7-10 illustrate reaction vessels according to embodiments of the present invention.

In one embodiment, an internally heated extraction reaction does not use an external heat source and the extraction operation (200) requires only the extraction vessel (37) to contain the chemical blend (37) as illustrated in FIG. 7.

Figure 8:
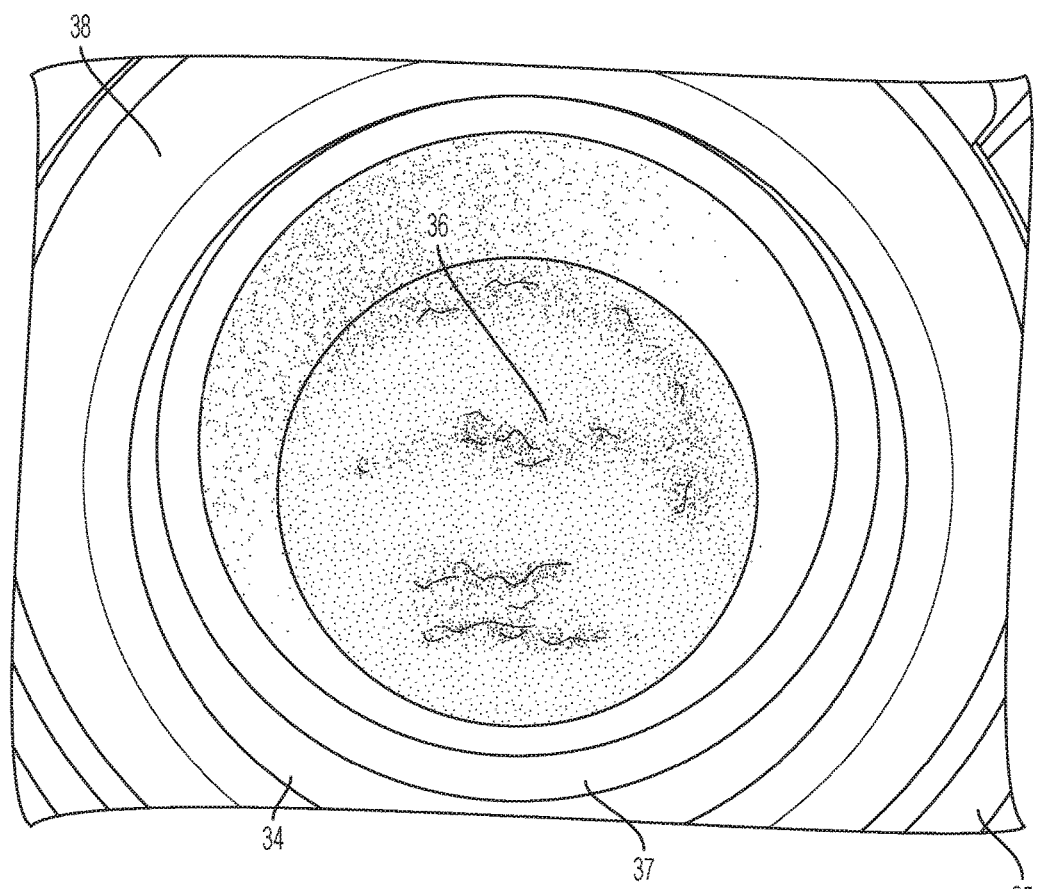
Figure 9:
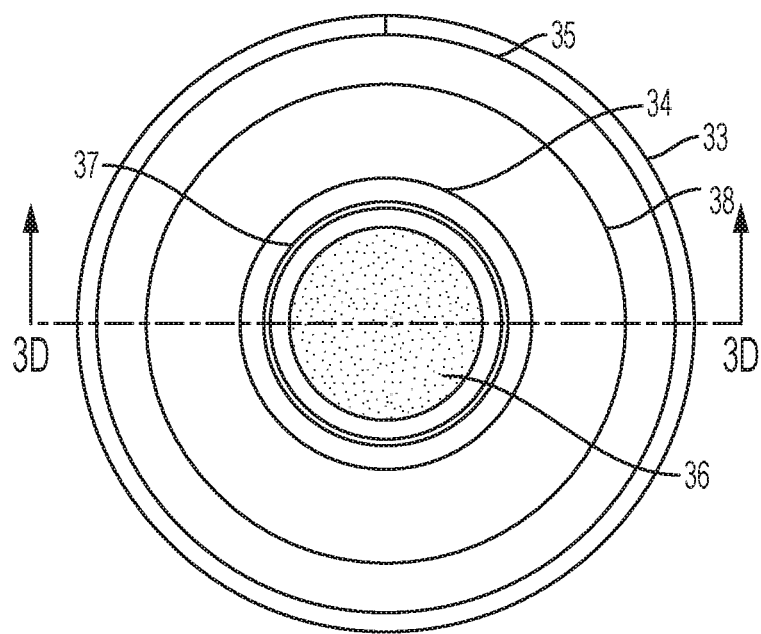

FIGS. 8-9 illustrates a top view of the externally heated extraction apparatus containing the chemical blend (36). As illustrated in FIGS. 8-9, the chemical blend (36) is contained within an extraction vessel (37). The extraction vessel (37) is surrounded by the susceptor crucible (34) and the ceramic insulation sleeve (35). In some embodiments, additional insulator material (38) is disposed between the susceptor crucible (34) and the ceramic insulation sleeve (35). The ceramic insulation sleeve (35) is surrounded by the induction coil (33).

Figure 10:
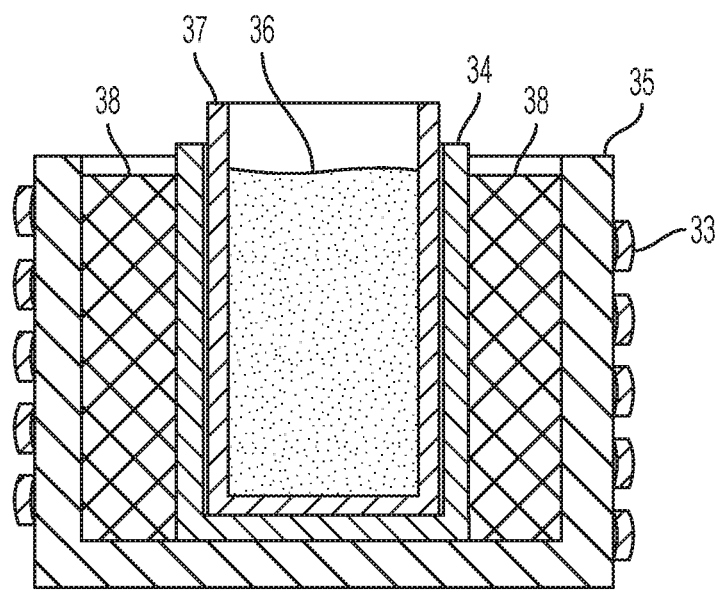

FIG. 10 is a cross-section illustration of the induction extraction apparatus of FIGS. 5-9. As illustrated in FIG. 10, the induction coil (33) induces electrical eddy currents within the susceptor crucible (34) to heat the extraction vessel (37). The heat generated in the susceptor crucible (34) is transferred to the chemical blend (36) within the extraction vessel (37) to initiate and maintain the chemical reaction associated with the extraction operation (200). In some embodiments, the susceptor crucible (34) may be metallic or graphite. For example, the susceptor crucible (34) may comprise a molybdenum (Mo) crucible 34. The susceptor crucible (34) with the extraction vessel (37) and the induction heating coil (33) may be included within the containment housing (30) to control a reaction atmosphere during the extraction operation (200). In some embodiments, when the titanium product comprises magnetic metals, such as iron, the susceptor crucible (34) may use molybdenum (Mo) to shield the chemical blend from magnetic fields generated by the induction furnace.

Figure 11:
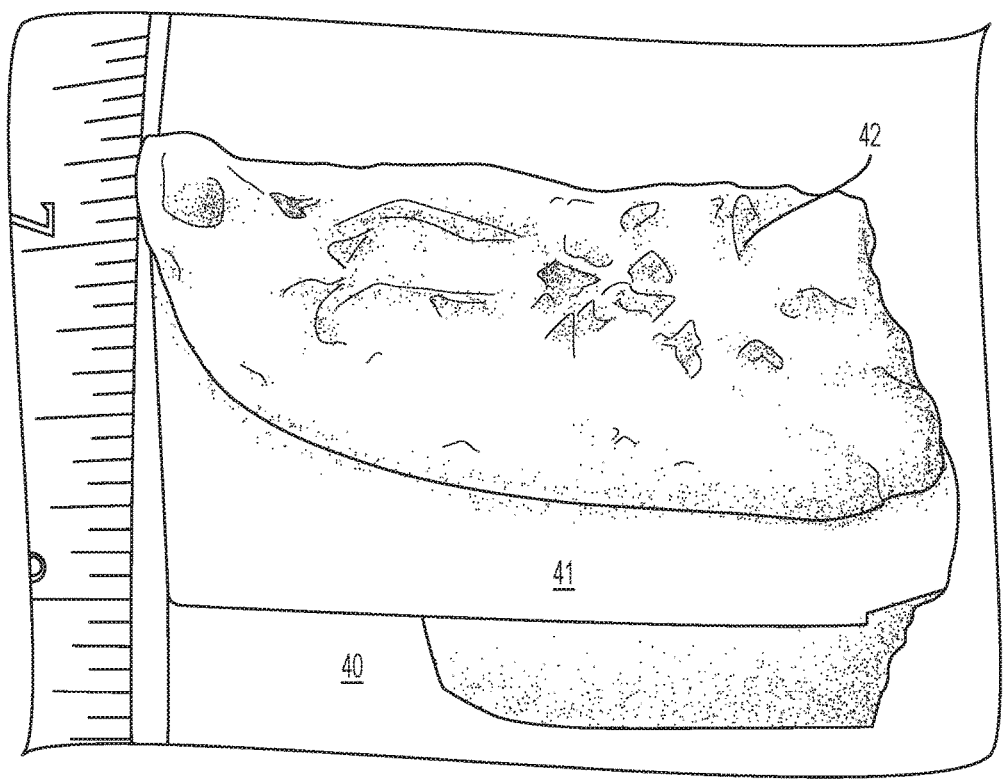
FIGS. 11-12 illustrates a titanium product obtained according to embodiments of the present invention.
Figure 12:
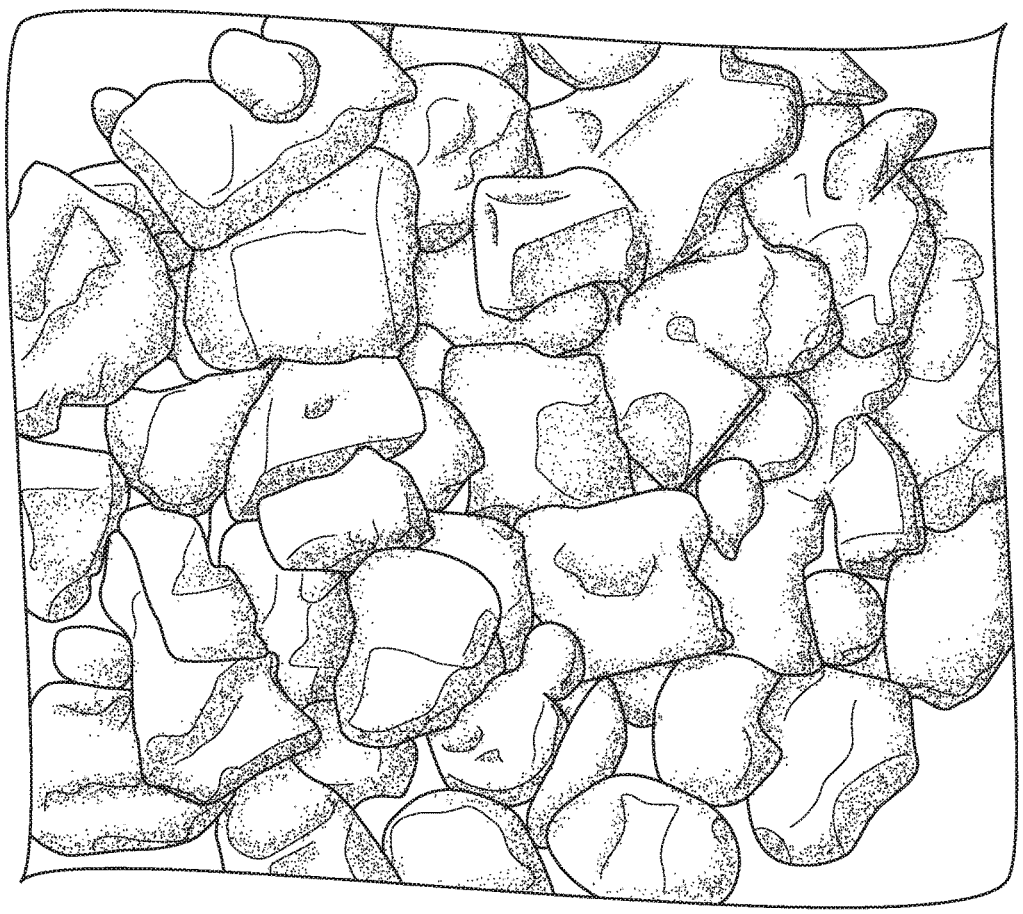

FIG. 11 is a cross-sectional cut of the extraction vessel (37) illustrating the product of an externally heated extraction operation (200) showing the extraction vessel bottom (40), titanium product (41), and slag (42). Note that the titanium product (41) has coalesced at the bottom of the reaction vessel (37) with the slag (42) having accumulated on top. Those skilled in the art will appreciate how this method can be utilized to produce other metals, such as, but not limited to, iron, chromium, copper, manganese, silicon, zirconium, etc. Ores of various metals can be combined into tailored blends with carefully matched reducing agents, viscosity controlling components, and heat generating components (if used in a self-heating reaction) to produce the desired metal product.

The induction furnace may be based on a 10 KHz, 50 KW Ajax-Tocco induction generator and a five turn copper coil as illustrated in FIGS. 5-10. Capacitance and power settings are adjusted to reach a desired temperature in a short amount of time. The susceptor crucible (34) is inside the coil (33) where it couples with the induction field generating eddy currents that create heat. This heat is transferred to the extraction reaction vessel (37) and the chemical blend (36). Graphite can be used for the extraction reaction vessel 37. Graphite is relatively inexpensive and any carbon that may adhere to the metal surface may be bead blasted away leaving the clean metal surface.

EXAMPLE 1

In one example of the present invention, a titanium product was extracted from a titanium-bearing ore as follows. Ore-10 concentrate was ground in a ball mill to pass through a 200 mesh standard sieve (<74 μm). A chemical blend was prepared by blending 425 g of the prepared ground Ore-10 ore concentrate, 230 g of aluminum powder, and 346 g of calcium fluoride in a jar mill for 30 to 45 minutes to achieve a uniform chemical blend (36). The chemical blend (36) was then charged into a cylindrical graphite reaction vessel (3.63" d×5.5" h) (37). The graphite reaction vessel (37) containing the chemical blend (36) was then placed into a graphite susceptor crucible (4.25" d×4.75" h) (34) within the five turn copper induction coil (33) of a 10 KHz, 50 KW Ajax-Tocco induction generator (31) and placed into the containment housing (30). The containment housing (30) was closed and purged with argon gas to displace oxygen from the system. The inert gas stream was then set to a flow rate of 50 standard cubic feet per hour (SCFH) and maintained throughout the remainder of the extraction operation (200). The induction generator (31) was then activated to heat the chemical blend (36) to ~1725° C. at a ramp up rate of 10° C./min and held at that temperature for 15 minutes. The induction furnace was then allowed to cool to room temperature and the reaction products were removed and prepared for analysis. FIG. 11 illustrates the titanium product extracted from the Ore-10 of Example 1 (see Tables 1 and 2 for chemical composition).

EXAMPLE 2

In another example, a titanium metal product was extracted from a titanium-bearing ore with a high calcium content as follows. Ore-19 concentrate was ground in a ball mill to pass through a 200 mesh standard sieve (<74 μm). A chemical blend was prepared by blending 439 g of the ground Ore-19 concentrate, 237 g of aluminum powder, and 358 g of calcium fluoride in a jar mill for 30 minutes to achieve a uniform chemical blend (36). The chemical blend (36) (~1 Kg) was then charged into a cylindrical graphite reaction vessel (3.63" d×5.5" h) (37). The graphite reaction vessel (37) containing the chemical blend (36) was then placed into a graphite susceptor crucible (4.25" d×4.75" h) (34) within the five turn copper induction coil (33) of a 10 KHz, 50 KW Ajax-Tocco induction generator (31) and placed inside containment housing (30). The containment housing (30) was closed and purged with argon gas to displace oxygen from the system. The inert gas stream was then set to a flow rate of 50 standard cubic feet per hour (SCFH) and maintained throughout the remainder of the extraction operation (200) The induction generator (31) was then activated. A temperature ramp rate of 10° C./min was used to heat the chemical blend (36) to ~1700° C. The reaction vessel and chemical blend were held at that temperature for 20 minutes. The induction furnace was then cooled to room temperature and the reaction products were removed and prepared for analysis. Tables 1 and 2 contain the composition data for the Ore-19 concentrate and the titanium product obtained therefrom.

Table 1 lists various titanium-bearing ore concentrates that have been used to extract titanium products using extraction operation (200). Table 1 includes the content of various oxides (wt % by X-ray Fluorescence (XRF) and Energy Dispersive X-ray Spectroscopy (EDX)) in the titanium-bearing ore concentrates. As illustrated in Table 1, many of the concentrates used in the extraction operation (200) contain impurity levels or TiO2 levels that would make them unsuitable for conventional titanium extraction methods.

TABLE 1

| Ti Ore Concentrate | $TiO_2$ | $Fe_2O_3$ | $SiO_2$ | $V_2O_5$ | $Al_2O_3$ | $ZrO_2$ | $MnO_2$ | CaO | MgO |
|---|---|---|---|---|---|---|---|---|---|
| XRF Data, Oxide Component | | | | | | | | | |
| Ore-1 | 87.96 | 4.03 | 1.42 | 0.20 | 0.51 | 1.92 | 0.16 | 0.03 | 0.08 |
| Ore-2 | 90.07 | 3.64 | 0.84 | 0.21 | 0.55 | 0.88 | 0.15 | 0.03 | 0.08 |
| Ore-3 | 84.92 | 2.95 | 4.66 | 0.21 | 1.16 | 2.27 | 0.13 | 0.20 | 0.09 |
| Ore-4 | 74.52 | 13.33 | 2.41 | 0.19 | 0.71 | 4.46 | 0.70 | 0.12 | 0.11 |
| Ore-5 | 64.05 | 30.40 | 0.38 | 0.14 | 1.08 | 0.20 | 1.39 | 0.06 | 0.17 |
| Ore-6 | 74.67 | 19.06 | 0.64 | 0.17 | 1.01 | 0.91 | 0.81 | 0.09 | 0.13 |
| Ore-7 | 62.66 | 28.34 | 1.59 | 0.14 | 1.09 | 1.50 | 1.48 | 0.07 | 0.19 |
| Ore-8 | 43.99 | 45.81 | 5.45 | 0.06 | 3.73 | 0.90 | 0.83 | 0.11 | 0.21 |
| Ore-9 | 65.55 | 27.76 | 0.70 | 0.14 | 1.00 | 0.54 | 1.41 | 0.06 | 0.16 |
| EDX Data, Oxide Component | | | | | | | | | |
| Ore-10 | 97.0 | 2.7 | ND | ND | 0.3 | ND | ND | 0.0 | ND |
| Ore-11 | 76.1 | 20.2 | 1.0 | ND | 1.5 | ND | 1.2 | 0.1 | ND |
| Ore-12 | 95.7 | 3.8 | 0.5 | ND | ND | ND | ND | 0.1 | ND |
| Ore-13 | 52.1 | 24.9 | 11.2 | ND | 11.3 | ND | ND | 0.4 | ND |
| Ore-14 | 34.4 | 45.5 | 8.4 | ND | 1.0 | ND | ND | 0.6 | 10.2 |
| Ore-15 | 68.1 | 28.3 | 0.5 | ND | 1.2 | ND | 1.7 | 0.2 | ND |
| Ore-16 | 53.0 | 42.1 | 2.1 | ND | 1.0 | ND | 1.7 | 0.1 | ND |
| Ore-17 | 64.8 | 32.3 | 0.6 | ND | 1.1 | ND | 1.2 | ND | ND |
| Ore-18 | 60.0 | 13.1 | 5.4 | ND | 0.7 | ND | ND | 20.0 | 0.9 |
| Ore-19 | 56.3 | 12.5 | 7.7 | ND | 0.7 | ND | ND | 20.3 | 2.6 |
| Ore-20 | 71.8 | ND | 0.3 | ND | ND | ND | ND | 0.4 | 27.4 |

NOTE:
Elemental data were used to calculate the equivalent oxide component for EDX analysis in the above table.
ND—Not Detected Table 2 summarizes the elemental analysis data for the titanium products obtained from extraction operation (200) from the titanium-bearing ores of table 1. Inductively Coupled Plasma (ICP), Interstitial Gas Fusion (IGF), and Energy Dispersive X-ray Spectroscopy (EDX) techniques were used to compare the ore concentrate samples and samples of the titanium product obtained through extraction operation (200).

TABLE 2

Elemental data of titanium product produced from titanium-bearing ores concentrates

| Element | Ore-10 | Ore-5 | Ore-6 | Ore-8 | Ore-13 | Ore-19 | Ore-20 |
|---|---|---|---|---|---|---|---|
| Ti | 72.7 | 60.3 | 55.1 | 28.3 | 94.3 | 81.8 | 64.9 |
| Al | 20 | 33 | 19.9 | 30.8 | 3.4 | 10.6 | 30.7 |
| Fe | 0.1 | ND | 20.8 | 34.6 | ND | ND | 0.25 |
| Si | 0 | 3.7 | 0.5 | 2.9 | ND | 2.1 | 0.2 |
| O | 6 | 0.5 | 1.8 | 0.2 | 1 | 5 | 1.8 |
| Mn | ND | 0.3 | 0.7 | 0.6 | 0.6 | 0.4 | ND |
| Nb | 0.01 | 0.5 | 0.2 | 0.9 | 0.1 | 0.1 | ND |
| Zr | 0.01 | 0.1 | 0.2 | 0.6 | 0.5 | ND | ND |
| V | 0.01 | ND | 0.1 | ND | 0.1 | ND | ND |
| Mg | ND | ND | ND | ND | ND | ND | ND |
| Other | balance | balance | balance | balance | balance | balance | balance |

ND—Not Detected
Other—summation of elements (e.g., Na, Mg, K, P, Cr, Ca, Sn, Th, Rare Earth Elements, etc.)

As illustrated in Table 2, titanium products with a high concentration of titanium was produced via extraction operation (200). While the titanium products from the extraction operation (200) may not have the titanium level necessary to qualify as aerospace-grade titanium, they are well suited for other applications. For example, automobiles, motorcycles, medical devices, hand tools, and armor plating use titanium products with the titanium concentrations listed on table 1. Moreover, subjecting these titanium products to refining operation (300) increases the titanium level of the titanium products to aerospace-grade levels.

EXAMPLE 3

As illustrated in FIG. 2, in one embodiment of the invention, a titanium product was extracted from a titanium-bearing ore under an internally heated extraction reaction (200) as follows. Anatase (TiO2) ore concentrate was obtained from Alfa Aesar (product #36199) at a standard sieve size of <325 mesh. A chemical blend was prepared by blending 240 g of the Anatase (TiO2) ore concentrate, 162 g of aluminum powder, 106 g or sodium chlorite, and 157 g of calcium fluoride in a jar mill for 30 minutes to achieve a uniform chemical blend. The chemical blend was then charged into a cylindrical ceramic reaction vessel of approximate dimensions (3" d×4.5" h). The ceramic reaction vessel containing the chemical blend was then buried part way in an earthen heat sink with the top of the vessel approximately 1" above the surface. Five grams of KMnO4 powder was placed in one spot near the center, on top of the blend and approximately 2 mL of glycerin was then poured onto the KMnO4. After about 20 seconds the KMnO4/glycerin mix began to burn which, in turn, initiated the extraction reaction. After the vessel had cooled for several hours, the titanium product was removed from the slag and prepared for analysis. FIG. 2 illustrates the titanium product produced in Example 3. The certificate of analysis data for the Anatase ore concentrate lists the composition to be predominately TiO2 with very small levels (<0.001 wt %) of the following impurities: Al, Cd, Cu, K, Mg, Pb, V, Ca, Cr, Fe, Li, Na and Si. Data from EDX analysis of the titanium product extracted from the Anatase ore concentrate indicate a weight percentage of: 71.2% Ti, 16.1% O, 12.1% Aluminum, and 0.6% Mn.

For applications that do not require a high titanium level, the titanium product extracted in operation (200) can be further processed into a final product in operation (500). For applications where a higher titanium level is required, the titanium product from the extraction operation (200) may be subject to further refining in operation (300).

In one embodiment of the present invention, the titanium product extracted in operation (200) may be further refined in operation (300) to remove unwanted elements and/or increase the titanium level. In another embodiment, titanium from other sources may be refined using the refining operation (300). In another embodiment, titanium from other sources may be combined with the titanium product extracted in operation (200) for refining operation (300). In one embodiment, the refining operation (300) incorporates titanium scrap from other sources (recycling operation 400). For example, in one embodiment, the present invention processes titanium metals and scrap having between 25% and 95% titanium content, and up to 20% oxygen content. In another embodiment, the refining operation (300) is able to process titanium scrap with up to 6% oxygen content. For example, in one embodiment, off-grade titanium sponge may be used as a feed material for the refining process of operation (300) by itself, or in addition to the titanium product obtained in operation (200) under recycling operation 400. Refined titanium products that emerge from the refining operation (300) have an improved titanium level relative to the feed materials. Impurities such as oxygen, iron, carbon, and silicon are removed from the titanium feed materials used during the refining operation (300).

In one embodiment of the present invention, refining of the titanium products in operation (300) is done via electrochemical refining. For example, in one embodiment, in operation (300) the titanium product obtained through the extraction operation (200) and/or obtained from other sources (operation 500) is placed in a reaction vessel having a cathode and an anode. An electrolyte capable of dissolving titanium ions is placed in the reaction vessel and heated to subject the titanium product to an electro-refining process in operation (300). In one embodiment of the present invention, the refining operation (300) is done under an inert atmosphere. In another embodiment, the refining operation (300) is done in batches.

In one embodiment of the invention, the anode is a non-consumable anode. In another embodiment, the distance between the anode and the cathode is adjustable during the refining operation (300). Adjusting the distance between the cathode and anode prevents the anode-cathode from shorting-out as titanium ions are deposited on the cathode and allows the maintenance of an optimum distance between the cathode and the anode throughout the refining operation (300). The electrolyte used during the refining operation (300) may include halide salts of alkali metals or alkali-earth metals or a combination of both to produce a chemical melt in the range of 600° C. to 900° C. If the temperature of the chemical melt is above 900° C., the evaporation rate of the electrolyte may be too high. The voltage between the anode and the cathode may be maintained at a predetermined level to prevent decomposition of the electrolyte during the purification process.

In one embodiment of the invention, a resistive element furnace or an induction furnace can be used to heat the electrolyte. In another embodiment, the external heat source used in operation (200) may be used to heat the electrolyte in operation (300).

While induction heating is not typically used to heat electrochemical processes because of the concern that the magnetic induction field may interfere with the electric field between the electrodes or affect metallic components in the chemical melt. For example when the titanium product is derived from a titanium-bearing ore including iron, the iron ions in the chemical melt may be attracted by the magnetic fields generated during the refining operation (300). However, the inventors have discovered that induction heating can be used for the refining operation (300) according to embodiments of the present invention without noticeable effects.

The refining operation (300) may use lower grade titanium products than are considered unsuitable for conventional methods due to high levels of oxygen. As titanium is recycled (scrapped) the oxygen content increases upon each re-melt which ultimately disqualifies it from being used in applications that require high titanium levels (e.g., the aerospace industry). In one embodiment, the refining operation (300) can reduce the oxygen level to make high titanium level products from titanium scrap or off-grade titanium sponge. For example, in one embodiment of the present invention, the refining operation (300) can process titanium products or scrap having less than 20% oxygen by weight. In another embodiment, the refining operation (300) can process titanium products or scrap having less than 6% oxygen by weight.

In one embodiment, the refining operation (300) is environmentally safe and low-cost. It does not use hazardous chemicals or produce greenhouse gases, such as $CO_2$.

After the refining operation (operation 300), the resulting refined titanium product can be further processed into a final product in operation (500).

Figure 18:
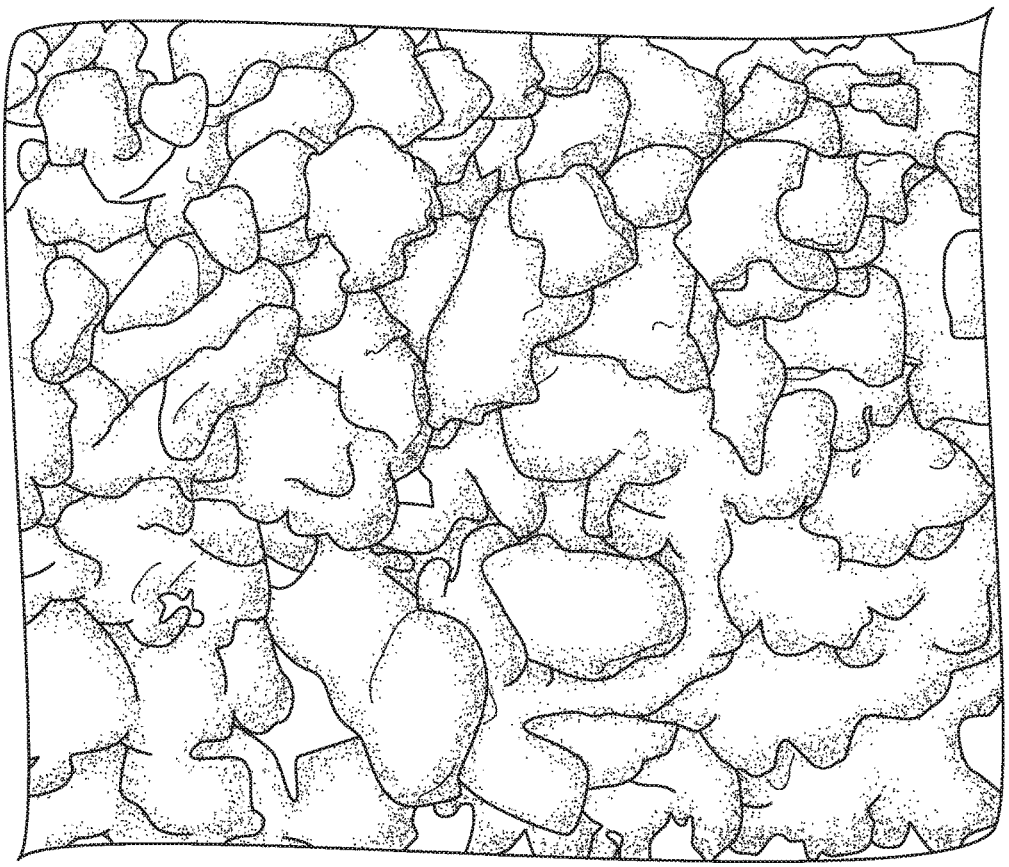
FIGS. 18-19 illustrate a dendritic titanium product (titanium wool) obtained according to embodiments of the present invention.
Figure 19:
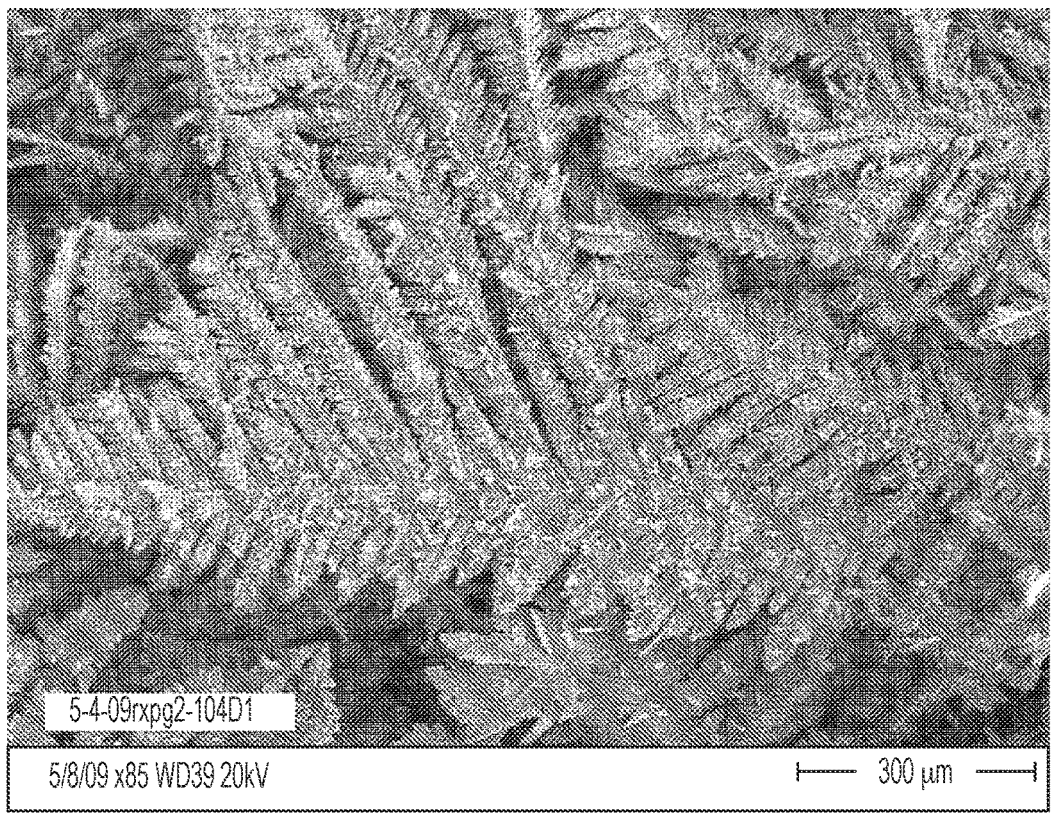

According to one embodiment of the present invention, the refining operation (300) produces a refined titanium product with a fine structured, dendritic morphology. For example, the titanium product may comprise titanium crystallites that have deposited on the cathode during the electro-refining operation (300). FIGS. 18-19 illustrate a refined titanium product having a dendritic form (titanium wool). FIG. 18 illustrates an unmagnified digital image and FIG. 19 illustrates a SEM micrograph of the refined titanium product. The fine dendritic structure of the titanium product is new to the titanium market and uniquely provides a pathway for near-net shaped parts through hydraulic compression and subsequent sintering without the aid of a binding agent. For example, in one embodiment, the refined titanium product has a surface area of at least 0.1 $m^2/g$ In another embodiment, the refined titanium product has a surface area between 0.1 $m^2/g$ and 2.5 $m^2/g$. In another embodiment, the refined titanium product has a surface area between 0.4 $m2/g$ and 2.0 $m^2/g$. In another embodiment, the refined titanium product has a surface area of 1.8 $m^2/g$.

Figure 22:
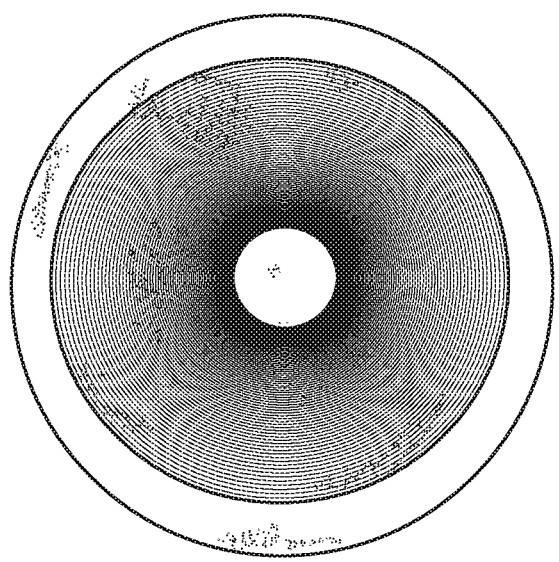
FIG. 22 illustrates a titanium product puck derived according to an embodiment of the present invention.
Figure 23:
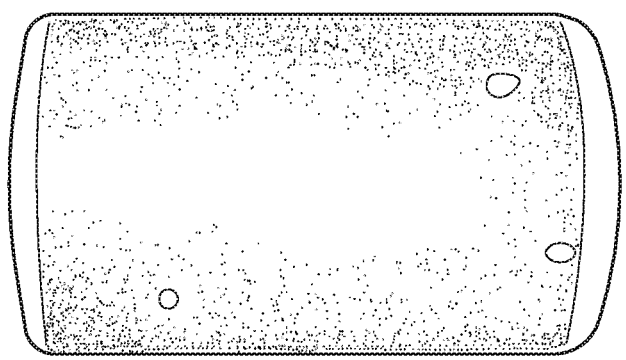
FIG. 23 illustrates a titanium product cylinder derived according to an embodiment of the present invention
Figure 24:
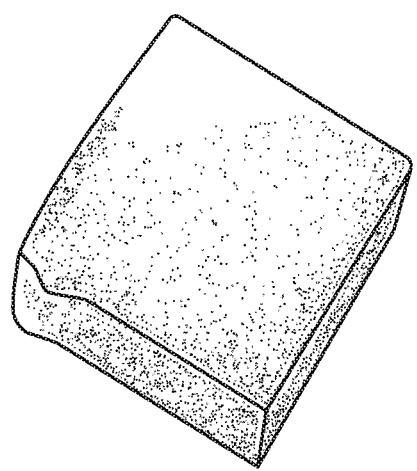
FIG. 24 illustrates a pressed and sintered titanium product derived according to an embodiment of the present invention.

Due to the small size and delicate nature of the refined titanium product, near-net-shaped products can be compressed for further processing in operation (500). For example, in one embodiment, the dendritic form of the refined titanium product (titanium wool) can be compressed by using hydraulic pressure. To accomplish this, the titanium wool is placed into a compression mold of desired shape. The mold is then placed into a hydraulic press where between 35 to 65 tons/$in^2$ is applied. This procedure can produce near-net shaped titanium parts that can then be sintered, used as consumable electrodes in a vacuum arc remelt (VAR) process, melted or further processed depending on the product application. FIGS. 22 and 23 respectively illustrate a titanium product puck and titanium product cylinder (green compacts) formed by hydraulic compression of the dendritic titanium wool produced through the extraction operation (200) and the refining operation (300) according to embodiments of the present invention. As illustrated in FIGS. 22 and 23, the titanium product puck and cylinder fashioned by compressing titanium wool conform into the intended shapes. Unlike traditional titanium powders, in some embodiments, the titanium wool produced from the refining operation (300) can be compressed without the aid of a binding agent. In other embodiments, the compressed titanium wool can be sintered to increase their density. For example, green compacts (compacts of titanium wool that have not been sintered) have densities of 85% to 88% of the full density of titanium (4.5 $g/cm^3$). After sintering the green compacts of titanium wool produced from the extraction operation (200) and the refining operation (300) at temperatures from 1220° C. to 1350° C., the resulting compacts densities range from 95% to 97% of full density. FIG. 24 is a section of a titanium puck that has been pressed, sintered, and polished. As illustrated in FIG. 24, the present invention provides a method of extracting and refining titanium-bearing ores into titanium wool to produce near-net shaped parts by compression and subsequent sintering procedures.

In addition, under other embodiments of the invention, the refining operation (300) produces a refined titanium product with a high surface area (1.8 $m^2/g$). Therefore, this refined titanium product can be used to make high surface area electrodes where applications requires high surface area (e.g. conduct electro catalytic reaction).

Figure 13:
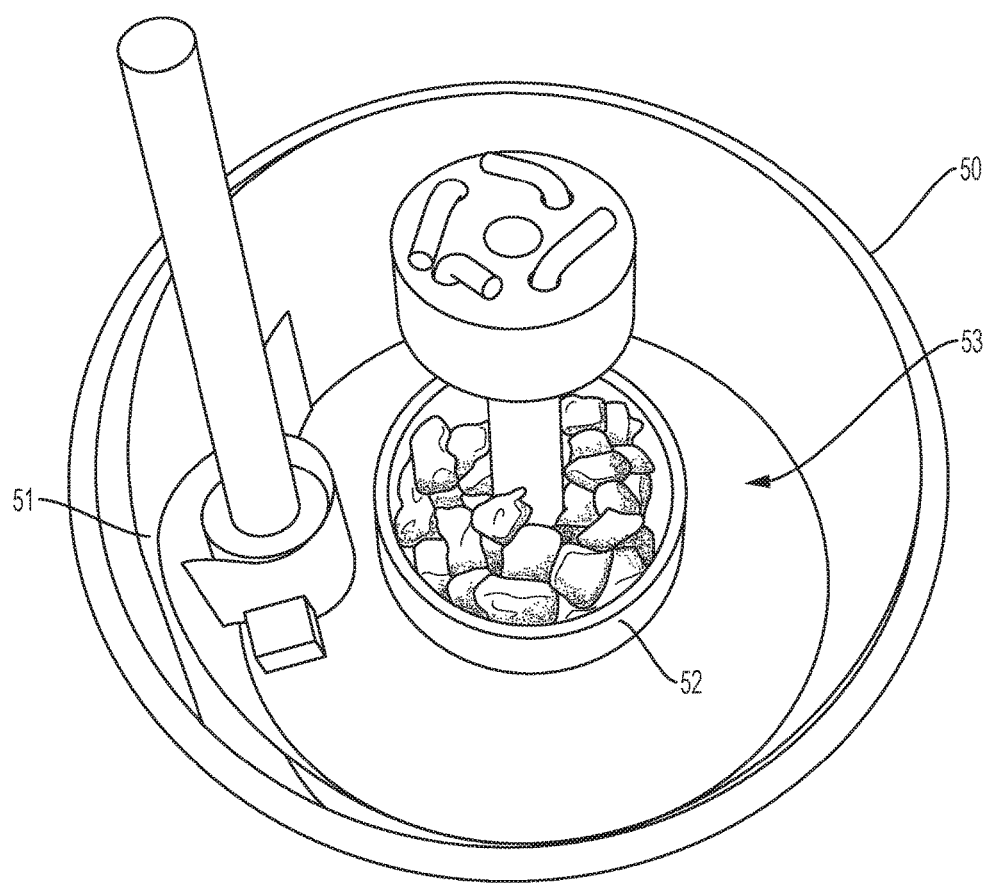
FIGS. 13-17 illustrate refining components of a system for the extraction and refining of titanium products according to embodiments of the present invention.
Figure 14:
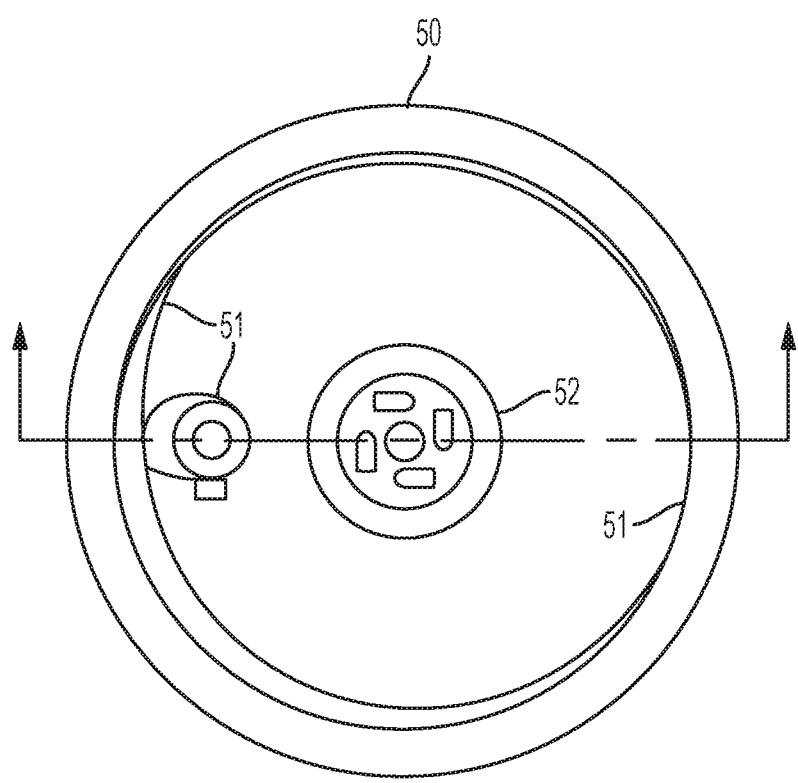
Figure 15:
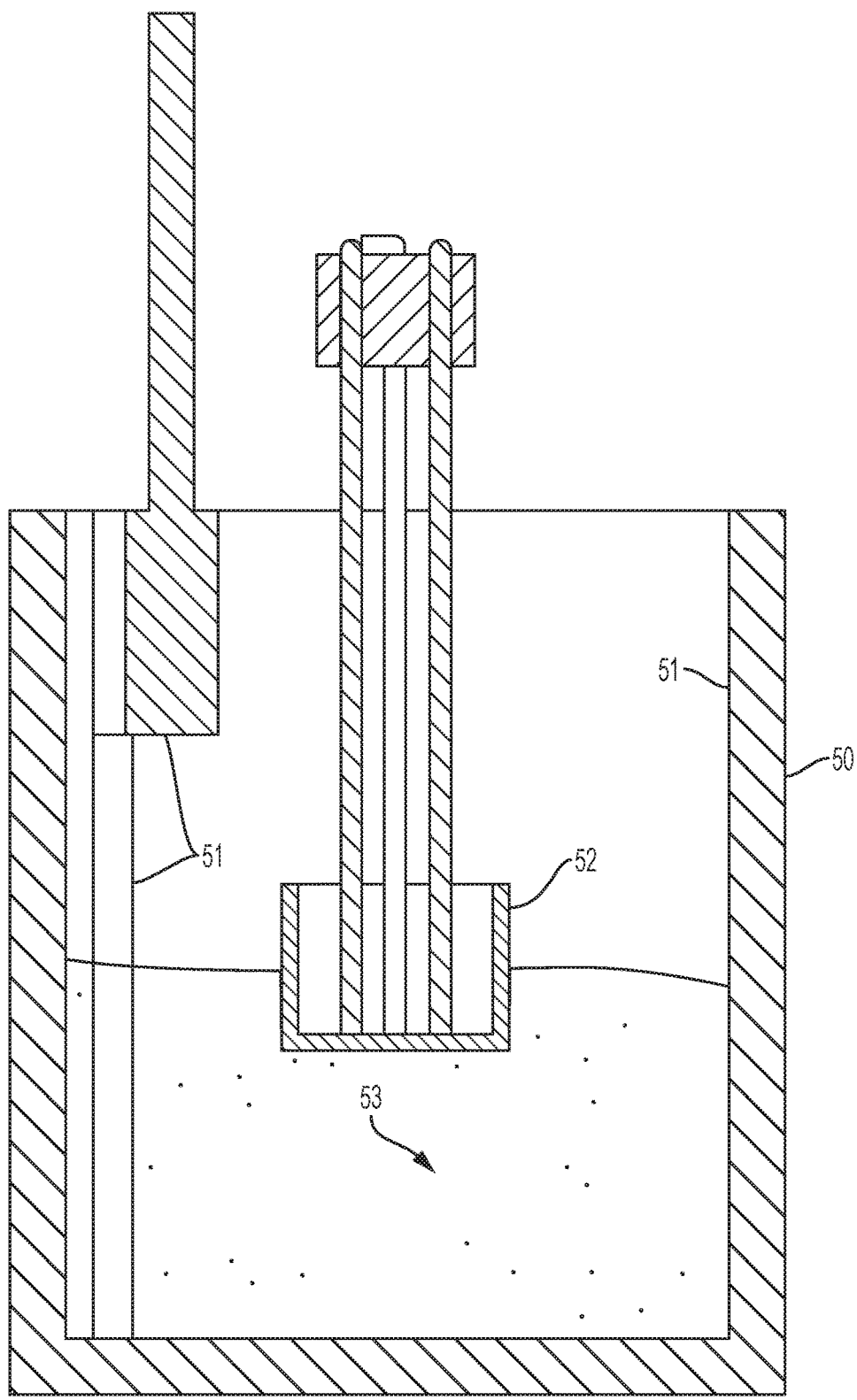

FIGS. 13-17 illustrate examples of a refining apparatus according to embodiments of the present invention. As illustrated in FIGS. 13-15, in one embodiment, a refining apparatus may include a reaction vessel (50), a cathode (51), and an anode (52). The anode (52) may be embodied as a perforated basket/container made from quartz, steel, or more noble metals than titanium (e.g., nickel or iron) to hold the titanium product garnered from the extraction operation (200) and/or titanium metal (e.g., off-grade titanium sponge) added through operation (400). The reaction vessel (50) holds the cathode (51), the anode (52), and an electrolyte (53) which are used to subject the titanium product to an electro-refining process.

Figure 16:
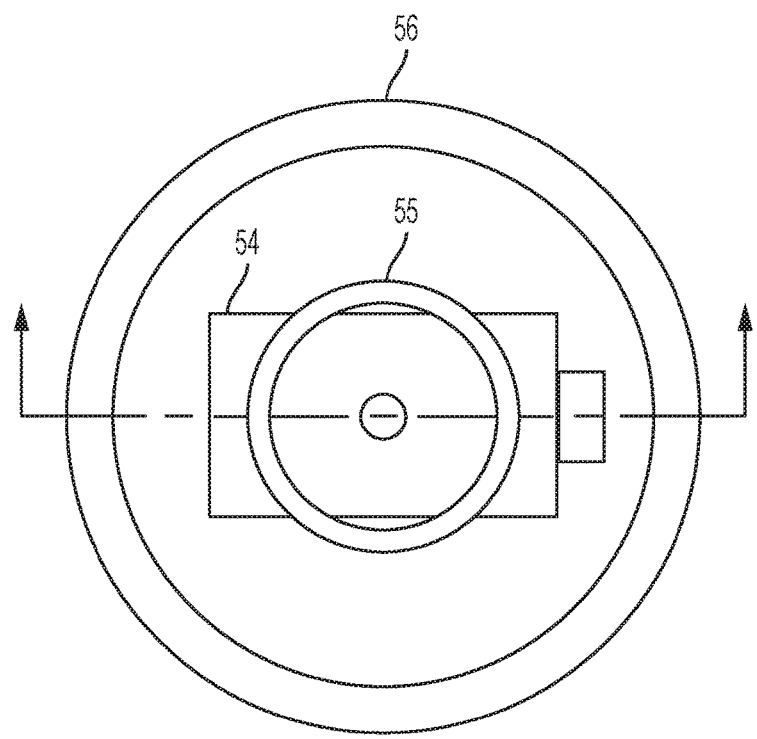
Figure 17:
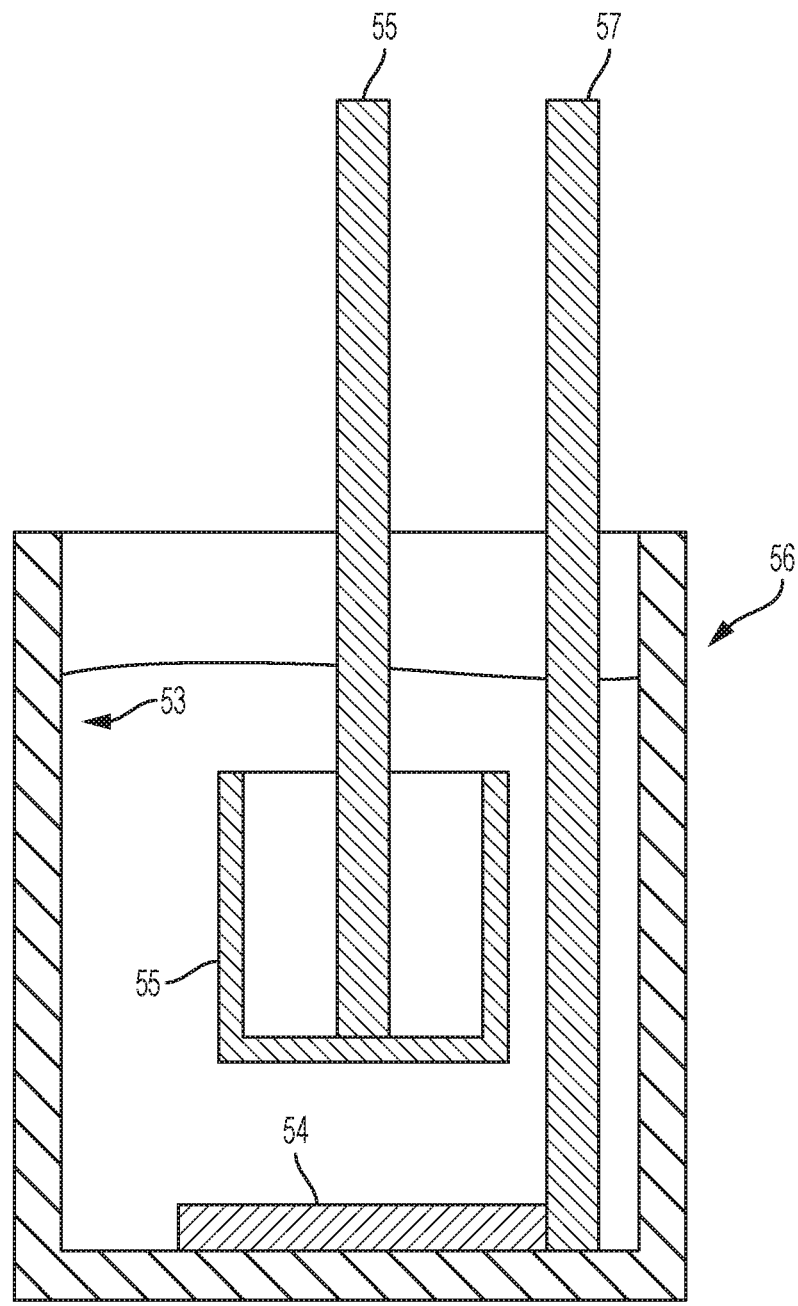

FIGS. 16 and 17 illustrate another example of a refining apparatus according to an embodiment of the present invention. As illustrated in FIGS. 16 and 17, in another embodiment, a refining apparatus may include a reaction vessel (56), a cathode (54), and an anode (55). The anode (55) is a movable perforated basket/container made from nickel, iron or metals more noble than titanium to hold the titanium product garnered from the extraction operation (200) and/or titanium (e.g., off-grade titanium sponge) added through operation (400). The reaction vessel (56) holds the cathode (54) in the bottom, the anode (55) suspended above the cathode (54), and an electrolyte (53) which are used to subject the titanium product to an electro-refining process.

Having the ability to adjust the distance between the cathode (54) and the anode (55) prevents the anode-cathode from shorting-out as titanium ions are deposited on the cathode and dendrites grow, allowing the maintenance of an optimum distance between the cathode and the anode throughout the refining operation (300). For example, in one embodiment, the cathode (54) to anode (55) distance is between 2 cm and 4 cm.

An electrolyte (53) used during the refining operation (300) may include halide salts of alkali metals or alkali-earth metals or a combination of both to produce a melt in the range of 600° C. to 900° C. A resistive element furnace or an induction furnace can be used to heat the electrolyte. In the present invention, both types of furnaces (resistive element and induction) have been used. In one embodiment, when using an induction furnace, a molybdenum susceptor crucible (34) was used to couple with the induction field in order to generate heat that was transmitted to the electrolyte blend. For example, in one embodiment of the invention, the induction furnace (31) used during operation (200) may be used during operation (300). Titanium products from the extraction operation (200), titanium scrap, or other metal pieces to be refined are placed into a perforated basket and used as the anode (52) in the electronic circuit by connecting a lead to the positive (+) side of an electric power supply, such as power supply (32). In one embodiment, metal foil can be placed around the inside of the reaction vessel (50) and used as the cathode (51) by connecting it to the negative (−) side of the electric power supply. In one embodiment, during operation (300), the impure titanium metal is oxidized (ionized) and titanium ions migrate to the cathode (51) where they are reduced to form titanium metal crystals or a dense titanium layer to make the refined titanium product. In some embodiments, impurities are concentrated (left behind) in the anode basket (52) or remain in the molten electrolyte (53).

Alternatively, in another embodiment, a cathode (54) in the form of a metal plate can be placed parallel to the bottom of the reaction vessel with the anode basket (55) suspended above the plate (54). In this configuration, the optimum distance between the cathode plate (54) and the anode basket (55) can be maintained by moving the anode basket vertically throughout the refining operation (300). The cathode (54) is connected to the negative (−) side of the power supply by the lead (57) and the anode (55) is connected to the positive (+) side of the power supply. In one embodiment, the cathode (54) to anode (55) distance is between 2 cm and 4 cm. While FIGS. 13-17 illustrate embodiments of the electro-refining cell, the present invention is not limited thereto, and other configurations for the electro-purification cell are possible. For example, a larger cell can be made with multiple, alternating anode/cathrode pairs. Each anode can be made of impure titanium and each cathode can be made from a pure metal formed into thin sheets.

EXAMPLE 4

A titanium metal product obtained through operation (200) was refined through refining operation (300) as follows: 160 g of titanium product was placed inside a perforated 100 ml quartz anode basket (52). The anode basket with titanium product pieces (52) was then placed into the center of the reaction vessel (50) made from quartz (volume—800 ml) filled with 650 g of an alkali halide salt blend (53) of sodium chloride (NaCl) and Potassium Chloride (KCl) at a 44:56 NACL:KCl weight percent ratio and surrounded by a metal foil cathode (51) made from molybdenum (Mo) (see FIGS. 13 and 15). The mixture of alkali halide salts was blended to produce a molten salt electrolyte (53) at a temperature of approximately 650° C. The refining apparatus was placed into the containment housing (30) and the electrodes were connected to the power supply (32). The containment housing (30) was purged with argon gas and heated to about 850° C.

Electro-refining was carried out by using an applied DC potential of 1.3 volts at a temperature of 750° C. In some embodiments, the refining process is carried out at a temperature 100° C. higher than the melting point of the salt blend to insure a complete melt and to avoid changes in the melting point due to salt loss from evaporation. In other embodiments, the electrical differential is between 0.5 and 2.5 volts or between 1.0 and 1.6 volts. After 9 hours, the refining vessel (50) was cooled to room temperature. The average cathode current density calculated was 0.03 A/cm$^2$. The frozen electrolyte salt was removed from the refined titanium product by washing with deionized water. Example 4 produced 34.0 g of refined titanium product (titanium wool) representing an 85% of theoretical yield. The final product was then dried and prepared for analysis and further processing. IGF analysis indicates that the oxygen level of refined titanium product was as low as 2000 parts per million (ppm).

Table 3 summarizes the composition results of various titanium products obtained from extraction operation (200) before and after the refining operation (300). As illustrated in Table 3, elemental impurities are removed or significantly reduced during the refining operation (300) from titanium metal products obtained from titanium-bearing ore concentrates having $TiO_2$, such as Rutile.

TABLE 3

| | Composition (weight %) of $TiO_2$-bearing ore concentrates | |
|---|---|---|
| Element | Before refining operation | After refining operation |
| Ti | 77.0 | 95.0-90.0 |
| Al | 19.0-12.0 | 10.0-5.0 |
| O | 9.0-7.0 | 0.6-0.2 |

In some embodiments of the invention, the only impurity remaining after the refining operation (300) is aluminum, which was introduced during the extraction operation (200) as the reducing agent. However, because the most commonly used titanium containing metal in today's aerospace and many other industries is an alloy containing aluminum, referred to as Ti-6AL-4V, titanium products with aluminum are readily usable in today's industry. For example, Ti-6Al-4V contains 90% by weight titanium (Ti), 6% aluminum (Al), and 4% vanadium (V). Data from Table 3 indicates that, in some embodiments, titanium products obtained from the refining operation (300) can be used as the base metal for producing Ti-6AL-4V if vanadium were incorporated into the titanium product.

Figure 20:
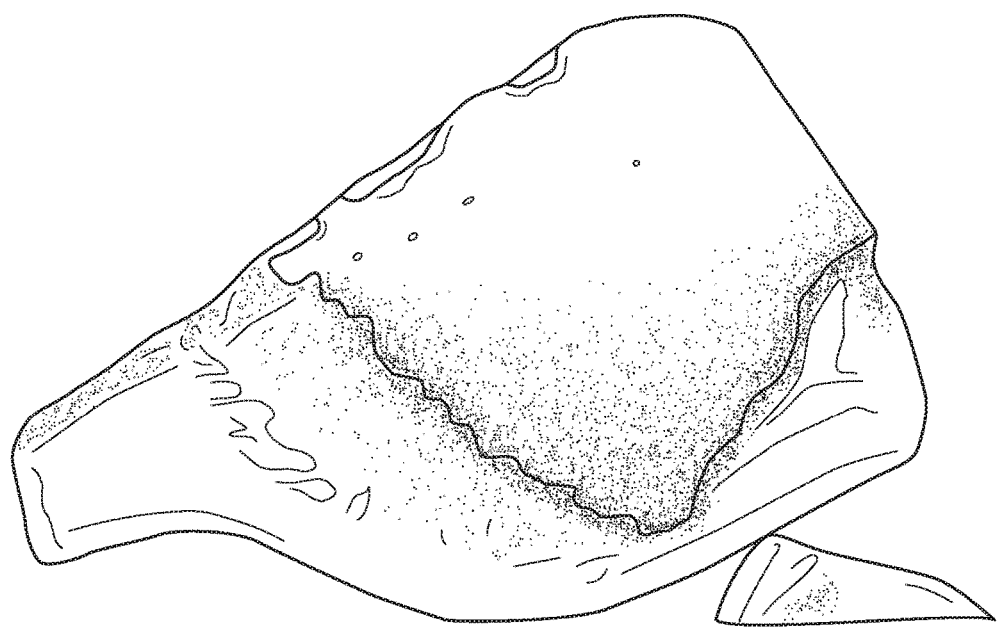
FIGS. 20-21 illustrate a titanium product coating derived according to an embodiment of the present invention.
Figure 21:
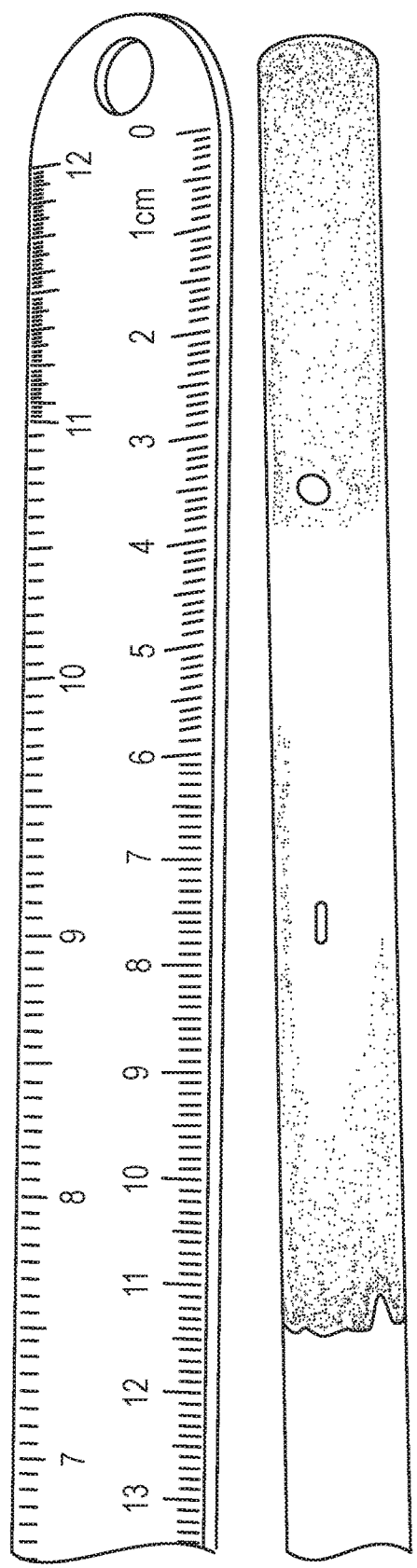

In other embodiments of the present invention, the refining operation (300) can also provide titanium coatings on non-conductive material surfaces, such as quartz ($SiO_2$) and alumina ($Al_2O_3$), by placing the non-conductive material between cathode (51) and anode (52). FIGS. 20-21 illustrate titanium coatings formed during the refining operation (300). FIG. 20 illustrates a titanium coating deposited onto a quartz substrate and FIG. 21 illustrates a titanium coating deposited on an alumina tube.

Table 4 lists EDX data illustrating the titanium level of coating deposited on quartz substrate during various runs of operation (300). The chlorine level in Table 4 is due to incomplete rinsing of the electrolyte from the refined titanium product.

TABLE 4

| Element | Sample 1 | Sample 2 | Sample 3 |
|---------|----------|----------|----------|
| Si | 0.00 | 2.05 | 0.00 |
| Cl | 0.03 | 1.39 | 1.33 |
| Ti | 99.97 | 96.56 | 98.67 |
| Wt % Total | 100.00 | 100.00 | 100.00 |

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A method, comprising:
   (a) heating a chemical blend to a temperature of between 1500° C.-1800° C., wherein the chemical blend consists of:
      a titanium-bearing ore comprising not greater than 75 wt. % titanium oxide;
      an Al reducing agent, configured to reduce the titanium-bearing ore to a titanium product; and
      a $CaF_2$ viscosity agent;
   wherein the ratio of the titanium-bearing ore to the reducing agent to the viscosity agent corresponds to a ratio of:
   3 of a titanium oxide component in the titanium-bearing ore, to
   from 4 to not greater than 7 of the Al reducing agent, to
   from 2 to not greater than 6 of the $CaF_2$ viscosity agent;
   (b) initiating an extraction reaction in the chemical blend to form: (1) a titanium product, and (2) a residual slag; and
   (c) separating the residual slag from the titanium product, wherein via the chemical blend ratio, the $CaF_2$ viscosity agent adjusts the slag viscosity to allow for efficient separation of the titanium product from the residual slag into two layers during the reaction;
   (d) configuring the titanium product from the extraction reaction as an anode in an electrolytic cell, wherein the electrolytic cell is configured with an electrolyte;
   (e) heating the electrolyte consisting of: halide salts of alkali metals, halide salts of alkali earth metals, or combinations thereof, to a temperature between 600° C. and 900° C. to provide a molten electrolyte, wherein the molten electrolyte is retained in a reaction vessel and is in contact with the anode and a cathode;
      1. directing a current from the anode, through the molten electrolyte bath to the cathode;
      2. depositing a refined titanium product on the cathode; and
      3. recovering the refined titanium product from the reaction vessel, wherein the refined titanium product comprises at least 90 wt. % titanium.

2. The method of claim 1, further wherein the chemical blend comprises a ratio of the titanium-bearing ore to the reducing agent that corresponds to a weight ratio of titanium oxide component in the titanium-bearing ore to a reducing metal in the reducing agent of 0.9 to 2.4.

3. The method of claim 1, wherein the heating step further comprises: heating the chemical blend at a ramp up rate between 1° C. to 50° C/min.

4. The method of claim 1, wherein the heating step further comprises: maintaining the chemical blend at the reaction temperature for a time period between 5 and 30 minutes.

5. The method of claim 1, wherein the method comprises prior to the configuring step, cooling the titanium product and residual slag to a temperature less than 1670° C.

6. The method of claim 1, wherein the titanium-bearing ore further comprises at least one of:
   up to 30% calcium (Ca),
   up to 20% magnesium (Mg),
   up to 20% manganese (Mn), or
   up to 35% iron (Fe).

7. The method of claim 1, wherein the titanium-bearing ore comprises titanium oxide, the reducing agent comprises aluminum, and the viscosity agent comprises calcium fluoride, further wherein the ratio of titanium-bearing ore to reducing agent to viscosity agent corresponds to the following equation:

$$3TiO_2+(4+x)Al+yCaF_2 \rightarrow 3Ti+xAl+2Al_2O_3+yCaF_2,$$
and wherein $0 < x < 3$ and $2 < y < 6$.

8. The method of claim 7, wherein $0.3 < x < 2$ and $2 < y < 3$.

9. The method of claim 7, wherein $x=0.8$ and $y=2.5$.

10. The method of claim 1, wherein the titanium-bearing ore comprises less than 50% by weight titanium oxide ($TiO_2$).

11. The method of claim 1, wherein the titanium-bearing ore has a particle size between 37 microns and 2000 microns.

12. The method of claim 1, wherein the titanium-bearing ore has a particle size of at least 100 microns.

13. The method of claim 1, wherein the titanium-bearing ore has a particle size of at least 500 microns.

14. The method of claim 1, wherein the refined titanium product comprises a surface area of at least 0.1 $m^2/g$.

15. The method of claim 1, wherein the refined titanium product comprises a surface area of between 0.1 $m^2/g$ and 2.5 $m^2/g$.

16. The method of claim 1, wherein the refined titanium product is fibrous.

17. The method of claim 1, wherein the refined titanium product has a wool-like morphology.

18. The method of claim 1, further comprising compacting a refined titanium product into a near net shaped green compact without a binding agent.

19. The method of claim 1, wherein the refined titanium product comprises titanium wool.

20. The method of claim 1, wherein the anode includes:
   a mesh container, wherein the mesh container is non-consumable; and
   the titanium product, which titanium product is retained in the mesh container and is consumable during the refining step.

21. The method of claim 20, wherein the anode further includes at least one of: off-grade titanium metal, off-grade titanium sponge, or scrap titanium.

22. The method of claim 1, wherein the electrical differential is between 0.5 volts and 2.5 volts.

23. The method of claim 1, wherein the electrical differential is between 1.0 volts and 1.8 volts.

24. The method of claim 1, wherein the refining step further comprises adjusting the anode such that the anode to cathode distance is between 1 cm and 6 cm.

25. The method of claim 1, wherein heating further comprises heating with an induction furnace.

26. The apparatus of claim 1, wherein the heating step further comprises: heating the chemical blend at a ramp up rate between 1° C. to 10° C./min.

27. A method, comprising:
(a) applying a thermal extraction process to a titanium-bearing ore, wherein the thermal extraction process comprises:
heating a chemical blend to a temperature of between 1500° C.-1800° C. to initiate an extraction reaction, wherein the chemical blend comprises: a titanium-bearing ore comprising not greater than 75 wt. % titanium oxide, an Al reducing agent; and a viscosity agent;
wherein the ratio of the titanium-bearing ore to the Al reducing agent to the viscosity agent corresponds to a ratio of:
3 of a titanium oxide component in the titanium-bearing ore, to
from 4 to not greater than 7 of the Al reducing agent, to
from 2 to not greater than 6 of the viscosity agent
reacting the chemical blend to form: (1) a titanium product, and (2) a residual slag;
(b) separating the residual slag from the titanium product, wherein via the chemical blend ratio, the viscosity agent adjusts the slag viscosity to allow for efficient separation of the titanium product from the residual slag into two layers during the reaction; and
(c) refining the titanium product obtained from the thermal extraction process in an electrochemical separation process, wherein the electrochemical separation process comprises:
1. heating an electrolyte consisting of halide salts of alkali metals, halide salts of alkali earth metals, or combinations thereof to a temperature between 600° C. and 900° C. to provide a molten electrolyte, wherein the electrolyte is retained in a reaction vessel;
2. applying an electrical differential between an anode and a cathode to deposit titanium on the cathode, wherein the anode and cathode are configured in the reaction vessel in contact with the electrolyte; and
3. recovering a refined titanium product from the reaction vessel, wherein the refined titanium product comprises at least 90 wt. % titanium; further wherein the refined titanium product is configured, via (a) and (b) as a fibrous, fine structured dendritic morphology with a surface area of between 0.1 m²/g and 2.5 m²/g.

28. The method of claim 27, wherein the titanium-bearing ore comprises less than 50% by weight titanium oxide ($TiO_2$).

29. The method of claim 27, further wherein the chemical blend comprises a ratio of the titanium-bearing ore to the reducing agent that corresponds to a weight ratio of titanium oxide component in the titanium-bearing ore to reducing metal in the reducing agent of 0.9 to 2.4.

30. The method of claim 27, wherein the heating step further comprises: heating the chemical blend at a ramp up rate between 1° C. to 50° C./min.

31. The method of claim 27, wherein the heating step further comprises: maintaining the chemical blend at the reaction temperature for a time period between 5 and 30 minutes.

32. The method of claim 27, wherein the applying a thermal extraction process further comprises, after the reacting step, cooling the titanium product and the residual slag to a temperature less than 1670° C.

33. The method of claim 27, further wherein the titanium-bearing ore further comprises at least one of:
up to 30% calcium (Ca),
up to 20% magnesium (Mg),
up to 20% manganese (Mn), or
up to 35% iron (Fe).

34. The method of claim 27, wherein the viscosity agent comprises calcium fluoride ($CaF_2$).

35. The method of claim 34, wherein the titanium-bearing ore comprises titanium oxide, the reducing agent comprises aluminum, and the viscosity agent comprises calcium fluoride, further wherein the ratio of titanium-bearing ore to reducing agent to viscosity agent corresponds to the following equation:

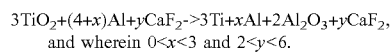

and wherein $0<x<3$ and $2<y<6$.

36. The method of claim 35, wherein $0.3<x<2$ and $2<y<3$.

37. The method of claim 35, wherein $x=0.8$ and $y=2.5$.

38. The method of claim 27, wherein the titanium-bearing ore has a particle size between 37 microns and 2000 microns.

39. The method of claim 27, wherein the titanium-bearing ore has a particle size of at least 100 microns.

40. The method of claim 27, wherein the titanium-bearing ore has a particle size of at least 500 microns.

41. The method of claim 27, wherein the refined titanium product has a wool-like morphology.

42. The method of claim 27, further comprising compacting the refined titanium product into a near net shaped green compact without a binding agent.

43. The method of claim 27, wherein the refined titanium product comprises titanium wool.

44. The method of claim 27, wherein the anode includes:
a mesh container, wherein the mesh container is non-consumable, and
the titanium product, which titanium product is retained in the mesh container and is consumable during the refining step.

45. The method of claim 44, wherein the anode further includes at least one of: off-grade titanium metal, off-grade titanium sponge, or scrap titanium.

46. The method of claim 44, wherein the mesh container is configured from at least one of: quartz, nickel, or iron.

47. The method of claim 27, wherein the electrical differential is between 0.5 volts and 2.5 volts.

48. The method of claim 27, wherein heating further comprises heating with an induction furnace.

49. The method of claim 27, wherein the refining step further comprises adjusting the anode such that the anode to cathode distance is between 1 cm and 6 cm.

50. The method of claim 27, wherein the heating step further comprises:
heating the chemical blend at a ramp up rate of between 1° C. to 10° C./minute 10° C./min.

51. A method, comprising:
(a) applying a thermal extraction process to a titanium-bearing ore, wherein the thermal extraction process comprises:
heating a chemical blend to initiate an extraction reaction at a temperature of between 1500° C. and 1800° C., wherein the chemical blend comprises: a titanium-bearing ore comprising not greater than 75 wt % titanium oxide, a reducing agent; and a viscosity agent;
wherein the ratio of the titanium-bearing ore to the reducing agent to the viscosity agent corresponds to a ratio of:
3 of a titanium oxide component in the titanium-bearing ore, to
from 4 to not greater than 7 of the reducing agent, to
from 2 to not greater than 6 of the viscosity agent
reacting the chemical blend to form: (1) a titanium product, and (2) a residual slag, wherein via the viscosity agent, the titanium product is separated from the residual slag into two layers;
(b) refining the titanium product obtained from the thermal extraction process in an electrochemical separation process, wherein the electrochemical separation process comprises:
  1. heating an electrolyte consisting essentially of: halide salts of alkali metals, halide salts of alkali earth metals, or combinations thereof, to a temperature between 600° C. and 900° C. to provide a molten electrolyte, wherein the electrolyte is retained in a reaction vessel;
  2. applying an electrical differential between an anode and a cathode to deposit titanium on the cathode, wherein the anode and cathode are configured in the reaction vessel in contact with the electrolyte; and
  3. recovering a refined titanium product from the reaction vessel, wherein the refined titanium product comprises at least 90 wt. % titanium, further wherein the refined titanium product is configured via (a) and (b) as a fine structured dendritic morphology; and
(c) compressing the refined titanium product in a mold to form a near-net shaped titanium part.

52. The method of claim 51, wherein the titanium-bearing ore comprises less than 50% by weight titanium oxide ($TiO_2$).

53. The method of claim 51, further wherein the chemical blend comprises a ratio of the titanium-bearing ore to the reducing agent that corresponds to a weight ratio of titanium oxide component in the titanium-bearing ore to reducing metal in the reducing agent of 0.9 to 2.4.

54. The method of claim 51, wherein the heating step further comprises: heating the chemical blend at a ramp up rate between 1° C. to 50° C./min.

55. The method of claim 51, wherein the heating step further comprises:
maintaining the chemical blend at the reaction temperature between for a time period between 5 and 30 minutes.

56. The method of claim 51, further wherein the titanium-bearing ore further comprises at least one of:
up to 30% calcium (Ca),
up to 20% magnesium (Mg),
up to 20% manganese (Mn), and
up to 35% iron (Fe).

57. The method of claim 51, wherein the titanium-bearing ore comprises titanium oxide ($TiO_2$), further wherein the reducing agent comprises aluminum (Al).

58. The method of claim 51, wherein the viscosity agent comprises calcium fluoride ($CaF_2$).

59. The method of claim 51, wherein the titanium-bearing ore has a particle size between 37 microns and 2000 microns.

60. The method of claim 51, further comprising compacting a refined titanium product into a near net shaped green compact without a binding agent.

61. The method of claim 51, wherein the refined titanium product comprises a titanium wool product having a surface area of at least 0.1 $m^2/g$.

62. The method of claim 51, wherein the refined titanium product comprises at least 98% titanium and the surface area of the refined titanium product is between 0.1 $m^2/g$ and 2.5 $m^2/g$.

63. The method of claim 51, wherein the refined titanium product comprises: between 90-96% titanium, 4-9% Al, and up to 1% O, and further wherein, the refined titanium product is in the form of a titanium wool product having a surface area of 1.8$m^2/g$.

64. The method of claim 51, wherein the refined titanium product consists essentially of between 90-96% titanium, 4-9% Al, and up to 1% O, and further wherein, the refined titanium product is in the form of a titanium wool product having a surface area of 1.8$m^2/g$.

* * * * *